United States Patent
Racape et al.

(10) Patent No.: US 11,102,510 B2
(45) Date of Patent: Aug. 24, 2021

(54) METHOD AND APPARATUS FOR INTRA PREDICTION WITH INTERPOLATION

(71) Applicant: INTERDIGITAL VC HOLDINGS, INC., Wilmington, DE (US)

(72) Inventors: Fabien Racape, Cesson-Sevigne (FR); Franck Galpin, Cesson-Sevigne (FR); Gagan Rath, Cesson-Sevigne (FR); Fabrice Leleannec, Cesson-Sevigne (FR)

(73) Assignee: InterDigital Madison Patent Holdings, SAS, Paris (FR)

( * ) Notice: Subject to any disclaimer, the term of this patent is extended or adjusted under 35 U.S.C. 154(b) by 79 days.

(21) Appl. No.: 16/617,180

(22) PCT Filed: May 30, 2018

(86) PCT No.: PCT/EP2018/064186
§ 371 (c)(1),
(2) Date: Nov. 26, 2019

(87) PCT Pub. No.: WO2018/220012
PCT Pub. Date: Dec. 6, 2018

(65) Prior Publication Data
US 2021/0136408 A1    May 6, 2021

(30) Foreign Application Priority Data

May 31, 2017   (EP) ..................................... 17305635

(51) Int. Cl.
*H04N 19/105*   (2014.01)
*H04N 19/593*   (2014.01)
(Continued)

(52) U.S. Cl.
CPC ......... *H04N 19/593* (2014.11); *H04N 19/105* (2014.11); *H04N 19/176* (2014.11);
(Continued)

(58) Field of Classification Search
CPC .. H04N 19/593; H04N 19/105; H04N 19/176; H04N 19/182; H04N 19/186; H04N 19/59
(Continued)

(56) References Cited

U.S. PATENT DOCUMENTS

2014/0133565 A1   5/2014   Lee et al.

FOREIGN PATENT DOCUMENTS

EP     2388999    11/2011
EP     2391129    11/2011
(Continued)

OTHER PUBLICATIONS

Zhang, et al., Multiple direct modes for chroma intra coding, Joint Video Exploration Team (JVET) of ITU-T SG 16 WP3 and ISO/IEC JTC 1/SC 29/WG 11, 4th Meeting: Chengdu, CN, Oct. 15-21, 2016.
(Continued)

*Primary Examiner* — Nguyen T Truong
(74) *Attorney, Agent, or Firm* — Jamie T. Nguyen

(57) ABSTRACT

An improved method of performing intra prediction for encoding or decoding uses interpolation such that substitute samples are found for samples to be used in the interpolation calculation that lie outside a normal reference range. The substitute samples can be repeated end samples from the bottom of a reference portion to the left of the target block, or right samples of a reference portion above the target block. An encoder can signal to a decoder whether to use intra prediction or interpolation prediction.

20 Claims, 17 Drawing Sheets

(51) Int. Cl.
*H04N 19/176* (2014.01)
*H04N 19/59* (2014.01)
*H04N 19/186* (2014.01)
*H04N 19/182* (2014.01)

(52) U.S. Cl.
CPC ......... *H04N 19/182* (2014.11); *H04N 19/186* (2014.11); *H04N 19/59* (2014.11)

(58) Field of Classification Search
USPC .................................................... 375/240.12
See application file for complete search history.

(56) References Cited

FOREIGN PATENT DOCUMENTS

| EP | 2712192 | 3/2014 |
| EP | 2988501 | 5/2017 |
| WO | WO2013107931 | 7/2013 |
| WO | WO2016066093 | 5/2016 |
| WO | WO2017018664 | 2/2017 |

OTHER PUBLICATIONS

Lainema et al., Chapter 4 Intra-picture prediction in HEVC, In: High Efficiency Video Coding (HEVC), Aug. 1, 2014, vol. 29, pp. 91-112.

Sjoberg et al., BoG report and proposal on padding of unavailable reference samples for intra prediction, Network Working Group RFC 1717, Internet Society (ISOC) 4, rue des Falaises CH-1205 Geneva Switzerland, No. JCTVC-E488, Mar. 19, 2011.

Kumakura, Non-Ce6: On intra chroma mode coding, 7. JCT-VC Meeting; 98, MPEG Meeting; Nov. 21, 2011—30-11-201, Geneva, (Joint Collaborative Team on Video Coding of ISO/IEC JTC1/SC29/WG11 and ITU-T SG.16, URL: http://wftp3.itu.int/av-arch/jctvc-site/,, No. JCTVC-G185, Nov. 9, 2011.

Shiodera et al., Block Based Extra/Inter-Polating Prediction for Intra Coding, Proceedings 2007 IEEE International Conference on Image Processing, ICIP 2007.

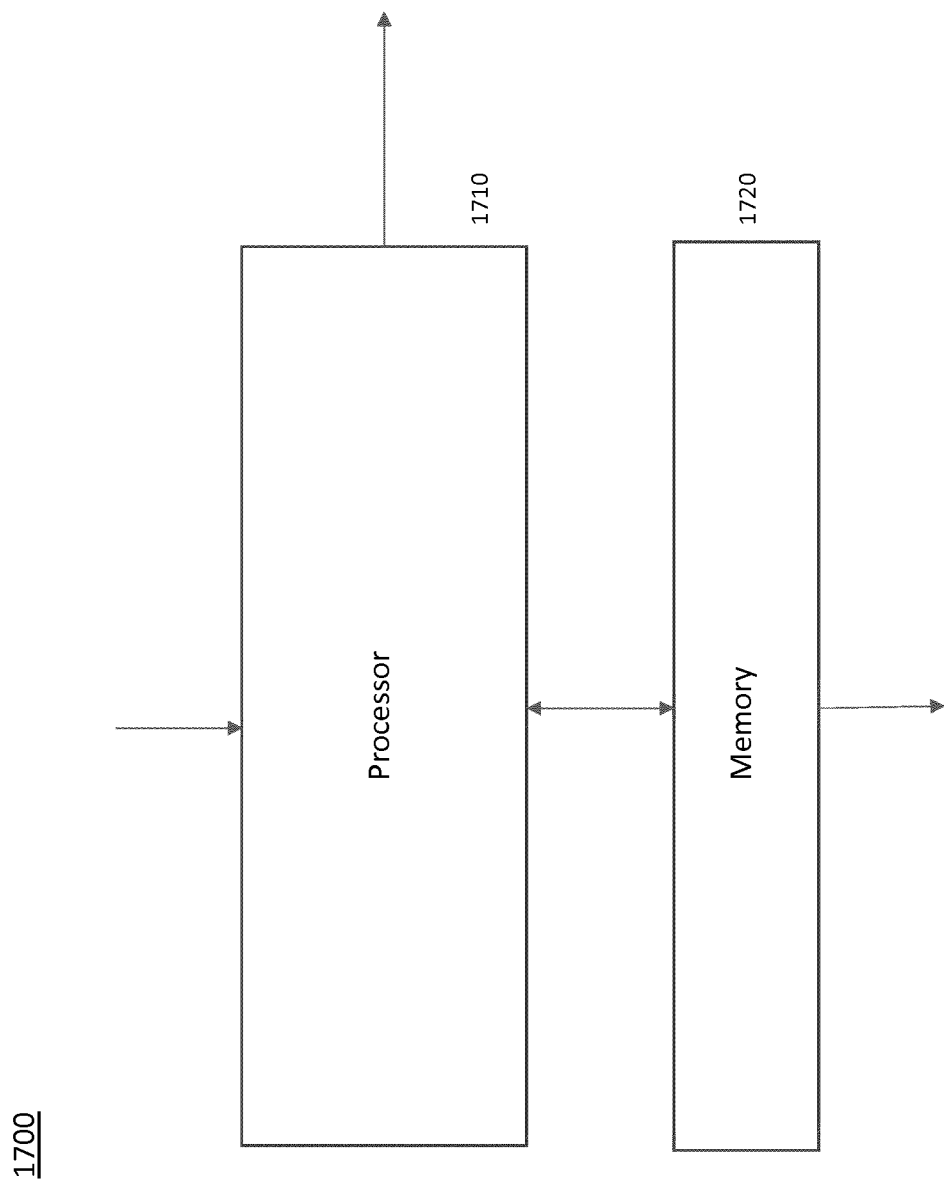

METHOD AND APPARATUS FOR INTRA PREDICTION WITH INTERPOLATION

FIELD OF THE INVENTION

The present principles relate to video compression and more particularly to performing intra prediction coding and decoding with interpolation of an image block.

BACKGROUND OF THE INVENTION

Various video coding standards have used intra coding, which uses prediction based on areas of the current image already coded or decoded. Intra coding using interpolation had been proposed in the standardization process of some of these standards, but was not included in those standards because of added complexity with insufficient coding gain. Those proposals suffered from other disadvantages, such as the interpolation calculation being approximate, or with only a few positive directions that use interpolations.

SUMMARY OF THE INVENTION

These and other drawbacks and disadvantages of the prior art are addressed by the present described embodiments, which are directed to a method and apparatus for intra prediction with interpolation for encoding and decoding video signals.

According to an aspect of the described aspects, there is provided a method. The method comprises determining whether to encode a block in a video image using intra prediction or interpolation prediction. If it is determined to use interpolation prediction, the method further comprises identifying an interpolation prediction mode for the block, the mode having a particular direction of prediction, and determining, for the identified interpolation prediction mode, whether one or more samples to be used for the interpolation are excluded from a reference section for performing the interpolation prediction in the particular direction. If it is determined that one or more of the samples are excluded from the reference section, the method further comprises using a substitute reference sample in said interpolation prediction. If it is determined that one or more of the samples are included in the reference section, the method further comprises performing an interpolation prediction in the particular direction according to the interpolation prediction mode using reference samples.

According to another aspect of the described aspects, there is provided an apparatus. The apparatus comprises a memory, and a processor, configured to perform determining whether to encode a block in a video image using intra prediction or interpolation prediction. If if it is determined to use interpolation prediction, the processor is further configured to perform identifying an interpolation prediction mode for the block, the mode having a particular direction of prediction, and determining, for the identified interpolation prediction mode, whether one or more samples to be used for the interpolation are excluded from a reference section for performing the interpolation prediction in the particular direction. If it is determined that one or more of the samples are excluded from the reference section, the processor is further configured to use a substitute reference sample in the interpolation prediction. If it is determined that one or more of the samples are included in the reference section, the processor is further configured to perform an interpolation prediction in the particular direction according to the interpolation prediction mode using reference samples.

According to another aspect of the described aspects, there is provided a method. The method comprises determining whether to decode a block in a video image using intra prediction or interpolation prediction. If it is determined to use interpolation prediction, the method further comprises identifying an interpolation prediction mode for the block, the mode having a particular direction of prediction, and determining, for the identified interpolation prediction mode, whether one or more samples to be used for the interpolation are excluded from a reference section for performing the interpolation prediction in the particular direction. If it is determined that one or more of the samples are excluded from the reference section, the method further comprises using a substitute reference sample in said interpolation prediction. If it is determined that one or more of the samples are included in the reference section, the method further comprises performing an interpolation prediction in the particular direction according to the interpolation prediction mode using reference samples.

According to another aspect of the described aspects, there is provided an apparatus. The apparatus comprises a memory, and a processor, configured to perform determining whether to decode a block in a video image using intra prediction or interpolation prediction. If if it is determined to use interpolation prediction, the processor is further configured to perform identifying an interpolation prediction mode for the block, the mode having a particular direction of prediction, and determining, for the identified interpolation prediction mode, whether one or more samples to be used for the interpolation are excluded from a reference section for performing the interpolation prediction in the particular direction. If it is determined that one or more of the samples are excluded from the reference section, the processor is further configured to use a substitute reference sample in the interpolation prediction. If it is determined that one or more of the samples are included in the reference section, the processor is further configured to perform an interpolation prediction in the particular direction according to the interpolation prediction mode using reference samples.

According to another aspect of the described aspects, there is provided a non-transitory computer readable medium containing data content generated according to any of the aforementioned encoding methods or encoder apparatus.

According to another aspect of the described aspects, there is provided a signal comprising video data generated according to any of the aforementioned encoding methods or encoder apparatus.

According to another aspect of the described aspects, there is provided computer program product comprising instructions which, when the program is executed by a processor and memory, cause the processor to carry out any of the aforementioned decoding methods.

These and other aspects, features and advantages of the present principles will become apparent from the following detailed description of exemplary embodiments, which is to be read in connection with the accompanying drawings.

BRIEF DESCRIPTION OF THE DRAWINGS

FIG. 17 shows one embodiment of an apparatus under the described aspects.

DETAILED DESCRIPTION

Figure 13:
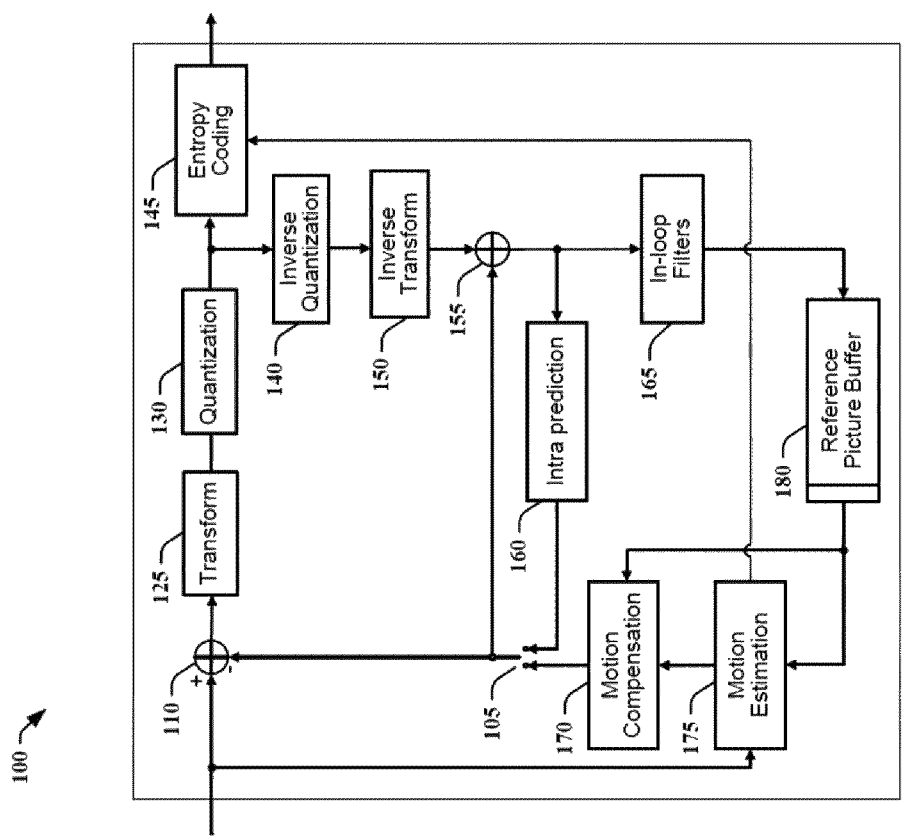
FIG. 13 illustrates a block diagram of an exemplary HEVC (High Efficiency Video Coding) video encoder.

An exemplary HEVC encoder 100 is shown in FIG. 13. To encode a video sequence with one or more pictures, a picture is partitioned into one or more slices where each slice can include one or more slice segments. A slice segment is organized into coding units, prediction units and transform units.

In the present application, the terms "reconstructed" and "decoded" may be used interchangeably, and the terms "picture" and "frame" may be used interchangeably. Usually, but not necessarily, the term "reconstructed" is used at the encoder side while "decoded" is used at the decoder side.

The HEVC specification distinguishes between "blocks" and "units," where a "block" addresses a specific area in a sample array (e.g., luma, Y), and the "unit" includes the collocated blocks of all encoded color components (Y, Cb, Cr, or monochrome), syntax elements, and prediction data that are associated with the blocks (e.g., motion vectors).

For coding, a picture is partitioned into coding tree blocks (CTB) of square shape with a configurable size, and a consecutive set of coding tree blocks is grouped into a slice. A Coding Tree Unit (CTU) contains the CTBs of the encoded color components. A CTB is the root of a quadtree partitioning into Coding Blocks (CB), and a Coding Block may be partitioned into one or more Prediction Blocks (PB) and forms the root of a quadtree partitioning into Transform Blocks (TBs). Corresponding to the Coding Block, Prediction Block and Transform Block, a Coding Unit (CU) includes the Prediction Units (PUs) and the tree-structured set of Transform Units (TUs), a PU includes the prediction information for all color components, and a TU includes residual coding syntax structure for each color component. The size of a CB, PB and TB of the luma component applies to the corresponding CU, PU and TU. In the present application, the term "block" can be used to refer to any of CTU, CU, PU, TU, CB, PB and TB. In addition, the "block" can also be used to refer to a macroblock and a partition as specified in H.264/AVC, H.265 or other video coding standards, and more generally to refer to an array of data of various sizes.

In the exemplary encoder 100 of FIG. 13, a picture is encoded by the encoder elements as described below. The picture to be encoded is processed in units of CUs. Each CU is encoded using either an intra or inter mode. When a CU is encoded in an intra mode, it performs intra prediction (160). In an inter mode, motion estimation (175) and compensation (170) are performed. The encoder decides (105) which one of the intra mode or inter mode to use for encoding the CU, and indicates the intra/inter decision by a prediction mode flag. Prediction residuals are calculated by subtracting (110) the predicted block from the original image block.

In order to exploit the spatial redundancy, CUs in intra mode are predicted from reconstructed neighboring samples within the same slice. The causal neighboring CUs have already been encoded/decoded when the encoding/decoding of the current CU is considered. To avoid mismatch, the encoder and the decoder have the same prediction. Therefore, both the encoder and the decoder use the information from the reconstructed/decoded neighboring causal CUs to form prediction for the current CU.

Figure 14A:
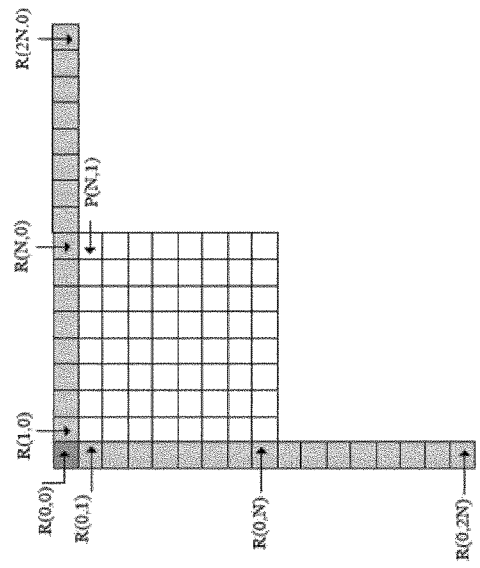
FIG. 14A is a pictorial example depicting the HEVC reference sample generation.

The intra prediction process in HEVC includes three steps: (1) reference sample generation, (2) intra sample prediction, and (3) post-processing of predicted samples. Exemplary HEVC reference samples are illustrated in FIG. 14A, where the reference pixel value at coordinate (x, y), with respect to one pixel above and to the left of the above-left corner of the current block, is indicated by R(x,y), and the predicted sample value at coordinate (x, y) of the current block is indicated by P(x,y). For a CU of size N×N, a row of 2N decoded samples on the top is formed from the decoded CUs. Similarly, a column of 2N samples on the left is formed from the decoded CUs. The corner pixel from the above-left decoded CU is used to fill up the gap between the above row and the left column references. If some of the samples are not available, for example, when the corresponding CUs is not in the same slice or the current CU is at a frame boundary, then reference sample substitution is performed where the missing samples are copied from the available samples in a clock-wise direction. Then, depending on the current CU size and the prediction mode, the reference samples are filtered using a specified filter. "Pixel" and "sample" are used interchangeably, unless otherwise noted.

Figure 14B:
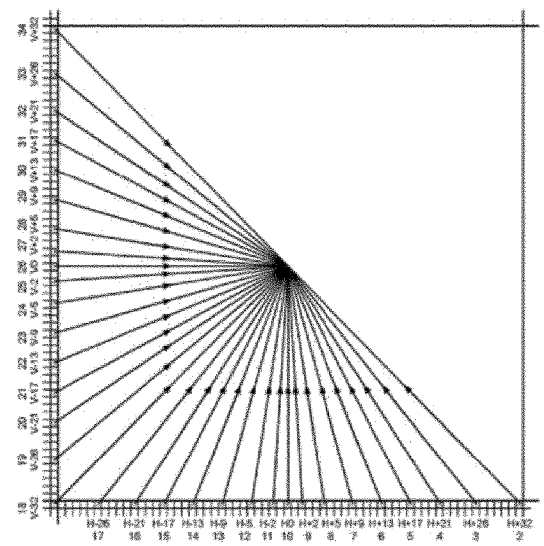
FIG. 14B is a pictorial example depicting intra prediction directions in HEVC.

The next step, the intra sample prediction, consists of predicting the pixels of the target CU based on the reference samples. In order to predict different kinds of content efficiently, HEVC supports a range of prediction methods. In particular, planar and DC prediction modes are used to predict smooth and gradually changing regions, whereas directional prediction modes (also referred to as "angular prediction modes") are used to capture different directional structures. HEVC supports 33 directional prediction modes which are indexed from 2 to 34. These prediction modes correspond to different prediction directions as illustrated in FIG. 14B, wherein the numbers (i.e., 2, 3, . . . , 34) denote intra prediction mode indices. The prediction modes 2-17 are denoted as horizontal prediction modes (H−26 to H+32), as the predominant sources of prediction is in horizontal direction. The modes 18-34 are denoted as vertical prediction modes (V−32 to V+32) accordingly. "H" and "V" in FIG. 14B are used to indicate the horizontal and vertical directionalities, respectively, while the numeric part of the identifier indicates the pixels' displacement (also referred to as "angle parameter") at 1/32 pixel fractions.

Table 1 shows the relationship between the directional prediction mode and the angle parameter A as specified by HEVC.

TABLE 1

| | Horizontal directions | | | | | | | | | | | | | | | |
|---|---|---|---|---|---|---|---|---|---|---|---|---|---|---|---|---|
| Mode index | 2 | 3 | 4 | 5 | 6 | 7 | 8 | 9 | 10 | 11 | 12 | 13 | 14 | 15 | 16 | 17 |
| A | 32 | 26 | 21 | 17 | 13 | 9 | 5 | 2 | 0 | −2 | −5 | −9 | −13 | −17 | −21 | −26 |

| | Vertical directions | | | | | | | | | | | | | | | | |
|---|---|---|---|---|---|---|---|---|---|---|---|---|---|---|---|---|---|
| Mode index | 18 | 19 | 20 | 21 | 22 | 23 | 24 | 25 | 26 | 27 | 28 | 29 | 30 | 31 | 32 | 33 | 34 |
| A | −32 | −26 | −21 | −17 | −13 | −9 | −5 | −2 | 0 | 2 | 5 | 9 | 13 | 17 | 21 | 26 | 32 |

The directions with non-negative displacements (i.e., H0 to H+32 and V0 to V+32) are also denoted as positive directions, and the directions with negative displacements (i.e., H−2 to H−26 and V−2 to V−32) are also denoted as negative directions.

As shown in FIG. 14B, the defined angular directions have a sample accuracy of 1/32. That is, between any two adjacent reference samples, there are 32 possible directions. As described above, the defined directions can be distinguished as either vertical or horizontal. The prediction modes in horizontal directions use either only left reference samples, or some left and some top reference samples. Similarly, the prediction modes in vertical directions use either only top reference samples, or some top and some left reference samples. The directions which use only left reference samples or only the top reference samples are defined to be positive directions. The horizontal positive directions from H0 to H+32 use only the left reference samples for prediction. Similarly, the vertical positive directions from V0 to V+32 use only the top reference samples for prediction. Negative horizontal and vertical directions (H−2 to H−26 and V−2 to V−32) use reference samples both on the left and on the top for prediction.

In HEVC reference code, a reference array is first constructed using the top and left reference samples. For vertical predictions, the reference array is horizontal (i.e., a reference row) and for horizontal predictions, the reference array is vertical (i.e., a reference column). For the modes with positive directions, the reference array is simply the top or left reference samples depending on the direction:

$$topRef[x]=R(x,0), 0 \leq x \leq 2N, \text{for vertical predictions}$$

$$leftRef[y]=R(0,y), 0 \leq y \leq 2N, \text{for horizontal predictions}$$

For the modes with negative directions, the reference array needs pixels from both the top and left reference arrays. In this case, the reference array will extend to the negative indices beyond 0. Sample values on the reference array with positive indices are obtained as above depending on vertical or horizontal prediction. Those on the reference array with negative indices are obtained by projecting the left (for vertical predictions) or top reference pixels (for horizontal predictions) on the reference array in the prediction direction:

$$topRef[x]=R(0,(x*B+16)>>5?), -N \leq x<0, \text{for vertical predictions}$$

$$leftRef[y]=R((y*B+128)>>8,0), -N \leq y<0, \text{for horizontal predictions}$$

where >> denotes a bit shift operation to the right and B represents the inverse angle parameter corresponding to angle parameter A.

Once the reference array is constructed, the prediction at any pixel position (x, y) inside the target PU is obtained by projecting the pixel position to the reference array along the selected direction and interpolating a value for the same at 1/32 pixel accuracy. The predicted sample value is computed by interpolating between two closest reference samples:

$$P(x,y)=((32-f)*topRef[x+i]+f*topRef[x+i+1]+16)>>5), 1 \leq x,y \leq N, \text{for vertical predictions} \quad (1)$$

$$P(x,y)=((32-f)*leftRef[y+i]+f*leftRef[y+i+1]+16)>>5), 1 \leq x,y \leq N, \text{for horizontal predictions}, \quad (2)$$

where i and f denote the integer part and the fractional part of the projected displacement from the pixel location (x, y). If Δ denotes the projected displacement, then Δ=x*A, for horizontal predictions, and Δ=y*A, for vertical predictions.

$$i=\Delta>>5, f=\Delta \& 31$$

where & denotes a bitwise AND operation. Note that, if f=0, that is, there is no fractional part, and the predicted sample value is equal to the reference array sample value in the direction of prediction.

Some of the prediction modes such as the DC mode and directly horizontal (i.e., mode 10) and directly vertical modes (i.e., mode 26) may cause discontinuity at the CU boundaries of the prediction samples. Therefore, such prediction modes are followed by a post-processing step where the boundary of the predicted samples are smoothed using a low-pass filter. Here, directly horizontal mode refers to the prediction mode when the reference samples on the left side of a target block are repeated horizontally to the right for intra prediction. Similarly, directly vertical mode refers to the prediction mode when the reference samples on the top of a target block are repeated vertically down for intra prediction.

Since there are multiple intra prediction modes available, the decoder needs the mode information to form the prediction for an intra-coded CU. The encoder encodes the mode information using a most probable mode (MPM) set for the luma component. HEVC specifies an MPM set consisting of three distinct modes, which is constructed from the prediction modes of the intra coded CUs on the top and left of the current CU, the planar mode, the DC mode, and the directly vertical mode.

The applicable luma intra prediction mode for the current block can be coded using two different options. If the applicable mode is included in a constructed list of three most probable modes (MPM), the mode is signaled by an index in the MPM list. Otherwise, the mode is signaled by a fixed-length binarization of the mode index. The three most probable modes are derived from the intra prediction modes of the top and left neighboring blocks.

For an inter CU, the corresponding coding block is further partitioned into one or more prediction blocks. Inter prediction is performed on the PB level, and the corresponding PU contains the information about how inter prediction is performed. The motion information (i.e., motion vector and reference picture index) can be signaled in two methods, namely, "merge mode" and "advanced motion vector prediction (AMVP)".

In the merge mode, a video encoder or decoder assembles a candidate list based on already coded blocks, and the video encoder signals an index for one of the candidates in the candidate list. At the decoder side, the motion vector (MV) and the reference picture index are reconstructed based on the signaled candidate.

In AMVP, a video encoder or decoder assembles candidate lists based on motion vectors determined from already coded blocks. The video encoder then signals an index in the candidate list to identify a motion vector predictor (MVP) and signals a motion vector difference (MVD). At the decoder side, the motion vector (MV) is reconstructed as MVP+MVD. The applicable reference picture index is also explicitly coded in the PU syntax for AMVP.

The prediction residuals are then transformed (125) and quantized (130). The quantized transform coefficients, as well as motion vectors and other syntax elements, are entropy coded (145) to output a bitstream. The encoder may also skip the transform and apply quantization directly to the non-transformed residual signal on a 4×4 TU basis. The encoder may also bypass both transform and quantization, i.e., the residual is coded directly without the application of the transform or quantization process. In direct PCM coding, no prediction is applied and the coding unit samples are directly coded into the bitstream.

The encoder decodes an encoded block to provide a reference for further predictions. The quantized transform coefficients are de-quantized (140) and inverse transformed (150) to decode prediction residuals. Combining (155) the decoded prediction residuals and the predicted block, an image block is reconstructed. In-loop filters (165) are applied to the reconstructed picture, for example, to perform deblocking/SAO (Sample Adaptive Offset) filtering to reduce encoding artifacts. The filtered image is stored at a reference picture buffer (180).

Figure 15:
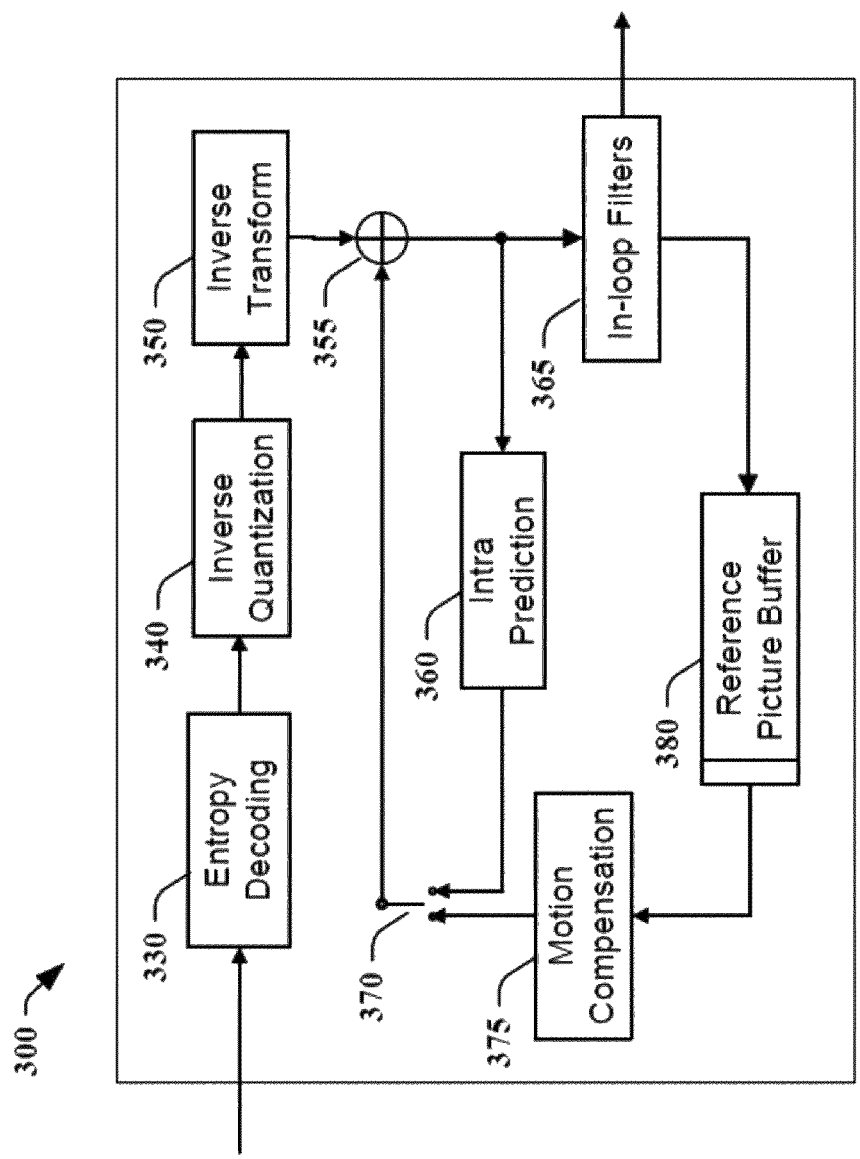
FIG. 15 illustrates a block diagram of an exemplary HEVC video decoder.

FIG. 15 illustrates a block diagram of an exemplary HEVC video decoder 300. In the exemplary decoder 300, a bitstream is decoded by the decoder elements as described below. Video decoder 300 generally performs a decoding pass reciprocal to the encoding pass as described in FIG. 13, which performs video decoding as part of encoding video data.

In particular, the input of the decoder includes a video bitstream, which may be generated by video encoder 100. The bitstream is first entropy decoded (330) to obtain transform coefficients, motion vectors, and other coded information. The transform coefficients are de-quantized (340) and inverse transformed (350) to decode the prediction residuals. Combining (355) the decoded prediction residuals and the predicted block, an image block is reconstructed. The predicted block may be obtained (370) from intra prediction (360) or motion-compensated prediction (i.e., inter prediction) (375). As described above, AMVP and merge mode techniques may be used to derive motion vectors for motion compensation, which may use interpolation filters to calculate interpolated values for sub-integer samples of a reference block. In-loop filters (365) are applied to the reconstructed image. The filtered image is stored at a reference picture buffer (380).

As described above, in HEVC, encoding of a frame of video sequence is based on a block structure. A frame is divided into square coding tree units (CTUs), which may undergo quadtree (QT) splitting to multiple coding units based on rate-distortion criteria. Each CU is either intra-predicted, that is spatially predicted from the causal neighbor CUs, or inter-predicted, that is, temporally predicted from reference frames already decoded. In I-slices all CUs are intra-predicted, whereas in P and B slices the CUs can be either intra or inter-predicted. For intra prediction, HEVC defines 35 prediction modes which include one planar mode (indexed as mode 0), one DC mode (indexed as mode 1) and 33 directional prediction modes (indexed as modes 2-34).

In JEM (Joint Exploration Model) under study by the Joint Video Exploration Team (JVET) for designing the next generation video compression standard, the QTBT (Quadtree plus Binary Tree) structure removes the concept of multiple partition types in HEVC, i.e., removes the separation of CU, PU and TU concepts. A Coding Tree Unit (CTU) is firstly partitioned by a quadtree structure. The quadtree leaf nodes are further partitioned by a binary tree structure. The binary tree leaf node is named as Coding Units (CUs), which is used for prediction and transform without further partitioning. Thus, the CU, PU and TU have the same block size in the new coding QTBT block structure. In JEM, a CU consists of Coding Blocks (CBs) of different color components. For ease of notation, the CUs or blocks resulting from a binary tree partition are also referred to as binary tree (BT) CUs or blocks, and the CUs or blocks resulting from a quadtree partition are also referred to as quadtree (QT) CUs or blocks.

As possible improvements to HEVC, JEM 3.0 uses 65 directional intra prediction modes in addition to the planar and DC modes. The modes are numbered from 2 to 66 in the increasing order, in the same fashion as done in HEVC from 2 to 34. The 65 directional prediction modes include the 33 directional prediction modes specified in HEVC plus 32 additional directional prediction modes that correspond to angles in-between two original angles. In other words, the prediction direction in JEM has twice the angle resolution of HEVC. The higher number of prediction modes has been proposed to exploit the possibility of angular structures with proposed larger block sizes. Corresponding to the higher number of modes, there is a higher number of angle parameter A values.

In addition to square CUs, JEM can also have rectangular CUs because of the QTBT structure. In this case, for positive directions, the reference array is constructed as follows:

$$\text{topRef}[x]=R(x,0), 0 \leq x \leq W+H, \text{for vertical predictions}$$

$$\text{leftRef}[y]=R(0,y), 0 \leq y \leq W+H, \text{for horizontal predictions}$$

where W and H denote the width and the height of the target CU, respectively. For negative directions, the reference array is constructed as above for positive indices. For negative indices, the projections of the left reference array (for vertical predictions) or top reference array (for horizontal predictions) are used:

$$\text{topRef}[x]=R(0,(x*B+16?)>>5?), -H \leq x < 0, \text{for vertical predictions}$$

$$\text{leftRef}[y]=R((y*B+128)>>8,0), -W \leq y < 0, \text{for horizontal predictions}.$$

The prediction process basically remains the same as in HEVC. The pixel values are computed as:

$$P(x,y)=((32-f)*\text{topRef}[x+i]+f*\text{topRef}[x+i+1]+16)>>5,$$
$$1\leq x\leq W, 1\leq y\leq H, \text{for vertical predictions} \quad (3)$$

$$P(x,y)=((32-f)*\text{leftRef}[y+i]+f*\text{leftRef}[y+i+1]+$$
$$16)>>5, 1\leq x\leq W, 1\leq y\leq H, \text{for horizontal predictions}. \quad (4)$$

As described above, HEVC and JEM aim to model different directional structures by different angular prediction models. Depending on the directionality, some prediction directions are termed positive and some are termed negative. The prediction models work well when the intensity values do not change too much along the prediction direction. However, in natural imagery, the intensity values on objects often undergo changes due to several reasons. For example, because of a color property of the object itself, lighting, depth, motion, etc., the intensity values over a PU can undergo changes that cannot be sufficiently modelled using pixel repetition. This is especially true when the PU size is large, for example, JEM has proposed to use CTU sizes up to 256. Therefore, we may consider other prediction models that may model the intensity change more efficiently.

Intra prediction is intended to exploit spatial correlation among pixels which belong to the same objects, backgrounds or regions. In this context, the intra prediction in video coding standards such as H.264/AVC, H.265/HEVC, or JEM has been designed to capture directionalities of object orientations and the slow changing intensity regions or textures. In HEVC, for example, the intra prediction includes 35 prediction modes which consist of one DC, one PLANAR, and 33 angular prediction modes. The angular modes are designed to model the directional structures of objects whereas the DC and the planar modes provide predictions for regions with slow and gradual intensity change and also for regions with varying textures. In the Joint Exploration Model (JEM), which aims at designing the future standard H.266, the number of prediction modes have been increased to 67 to accommodate further directions with bigger block sizes. In the case of directional prediction modes, the filtered pixel values from neighboring left and top neighbors are repeated in predefined directions followed by some post-filtering to eliminate abrupt changes at block boundaries in certain cases. In this disclosure, we propose to use interpolation besides simple pixel repetition for higher compression efficiency. While the pixel repetition is a good model for capturing the angularities of objects, it does not model the cases when the object intensities may change significantly. In such cases, prediction with interpolation can better model the directional structures leading to better compression efficiency.

The idea of using interpolation had been proposed in the HEVC standardization process but was not included in the final standard because of added complexity with insufficient coding gain. They suffered from the following disadvantages: the interpolation calculation is approximate, only a few positive directions use interpolations, and the normal predictions for those directions are replaced by proposed interpolations. In the described embodiments herein, new and better interpolation methods are described than the ones proposed. This proposal is different from the earlier proposed methods in several aspects: it uses a different interpolation algorithm that uses the exact interpolation, rather than any approximation as done previously. Secondly, it can apply the interpolation to all positive directions, not just a subset of positive directions. Depending on the complexity requirements at the encoder and decoder, the number of directions over which the interpolation is applied can be decided a-priori. Third, it does not replace the normal prediction by interpolative prediction, but proposes to include the latter as an additional model for prediction. Depending on the RD performance, the encoder can decide between the normal prediction method or the proposed method, and the method selected can be signaled using a 1-bit flag.

The general concepts described herein aim at improving the prediction efficiency in intra prediction. They propose to use interpolation instead of simple pixel repetition along positive directions whenever the interpolation gives better RD performance. Interpolation requires two or more reference pixels. For strictly positive prediction modes, certain pixels in a target CU can have two reference samples at both ends of the prediction direction. In such cases, we propose to use the linear interpolation as an alternative prediction. For the other pixels who have only one reference sample, we propose to use estimated reference samples at the bottom of the CU which serve as second reference samples. These reference samples are estimated using the top and left reference samples.

Intra prediction in video compression refers to the spatial prediction of a block of pixels using the information from the causal neighbor blocks, that is, the neighboring blocks in the same frame which have already been decoded. This is a powerful coding tool since it allows for high compression efficiency in INTRA frames, as well as in INTER frames whenever there is no better temporal prediction. Therefore, intra prediction has been included as a core coding tool in all video compression standards including H.264/AVC, HEVC, etc. In the following, for explanation purpose, we will refer to the intra prediction in HEVC standard and the current efforts to improve upon it, such as the JEM.

In HEVC, encoding of a frame of video sequence is based on a quad-tree (QT) block structure. A frame is divided into square coding tree units (CTUs) which all undergo quad-tree based splitting to multiple coding units (CUs) based on rate-distortion criteria. Each CU contains at least one prediction unit (PU), which are the basis blocks for prediction tools. In Intra prediction, a PU is spatially predicted from the causal neighbor PUs, i.e., the PUs on the top and the left. For that purpose, HEVC uses simple spatial models called prediction modes. Based on the decoded pixel values in the top and left PUs, called reference pixels, the encoder constructs different predictions for the target block and chooses the one that leads to the best RD performance. Out of the 35 defined modes, one is a planar mode (indexed as mode 0), one is a DC mode (indexed as mode 1) and the remaining 33 (indexed as mode 2-34) are angular modes. The angular modes aim to model the directional structures of objects in a frame. Therefore, the decoded pixel values in the top and left CUs are simply repeated along the defined directions to fill up the target block. Since this process can lead to discontinuities along the top and left reference boundaries for certain modes, those prediction modes include a subsequent post-filtering to smoothen the pixel values along those boundaries.

The above prediction models work very well as long as the intensity values do not change too much. However, in natural imagery, the intensity values on objects often undergo changes due to several reasons. Either as a color property of the object itself, or because of lighting, depth, motion, etc., the intensity values over a PU can undergo changes which cannot be sufficiently modelled using pixel repetition. This is especially true when the PU size is large. In JEM, it has been proposed to use CTU sizes up to 256.

Therefore, it is more meaningful to consider other prediction models such as interpolation which will model the intensity change much more efficiently.

Before we describe the proposed interpolation models, we briefly present the intra prediction in HEVC in the following.

Figure 1:
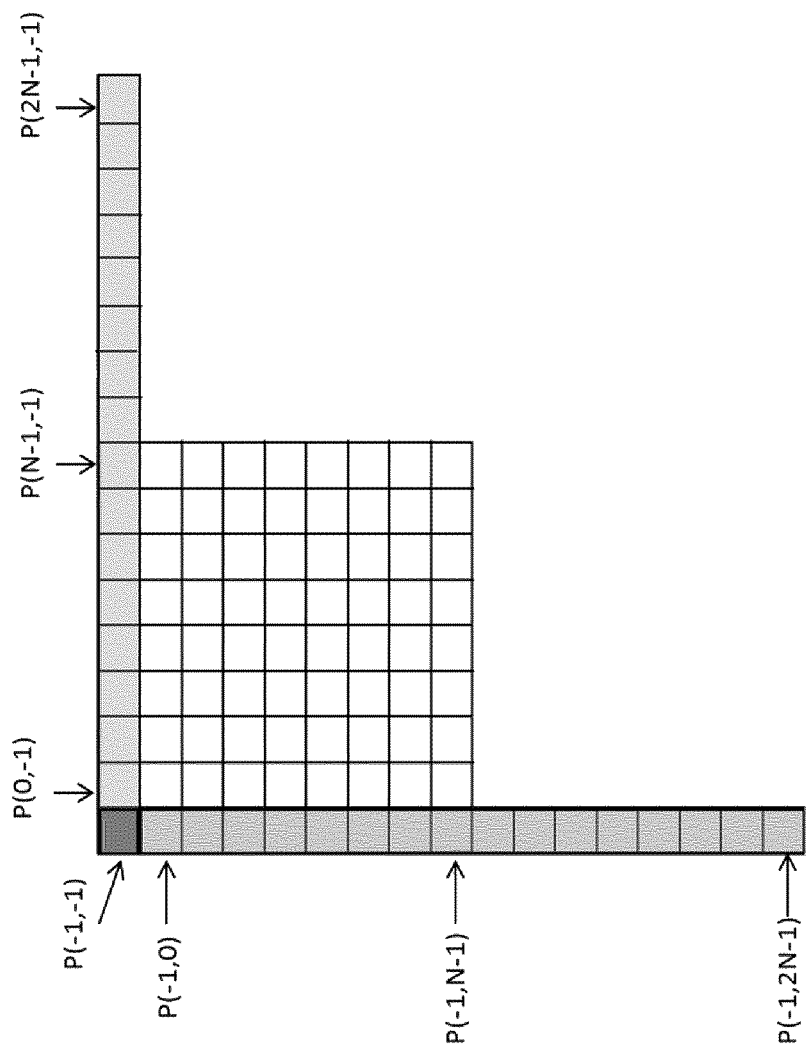
FIG. 1 illustrates reference samples for intra prediction in HEVC.

The intra prediction process in HEVC consists of three steps: (1) reference sample generation (2) intra sample prediction and (3) post-processing of predicted samples. The reference sample generation process is illustrated in FIG. 1. For a PU of size N×N, a row of 2N decoded samples on the top is formed from the previously reconstructed top and top right pixels to the current PU. Similarly, a column of 2N samples on the left is formed from the reconstructed left and below left pixels. The corner pixel at the top-left position is also used to fill up the gap between the top row and the left column references. If some of the samples on top or left are not available, because of the corresponding CUs not being in the same slice, or the current CU being at a frame boundary, etc., then a method called reference sample substitution is performed where the missing samples are copied from the available samples in a clock-wise direction. Then, depending on the current CU size and the prediction mode, the reference samples are filtered using a specified filter.

Figure 2:
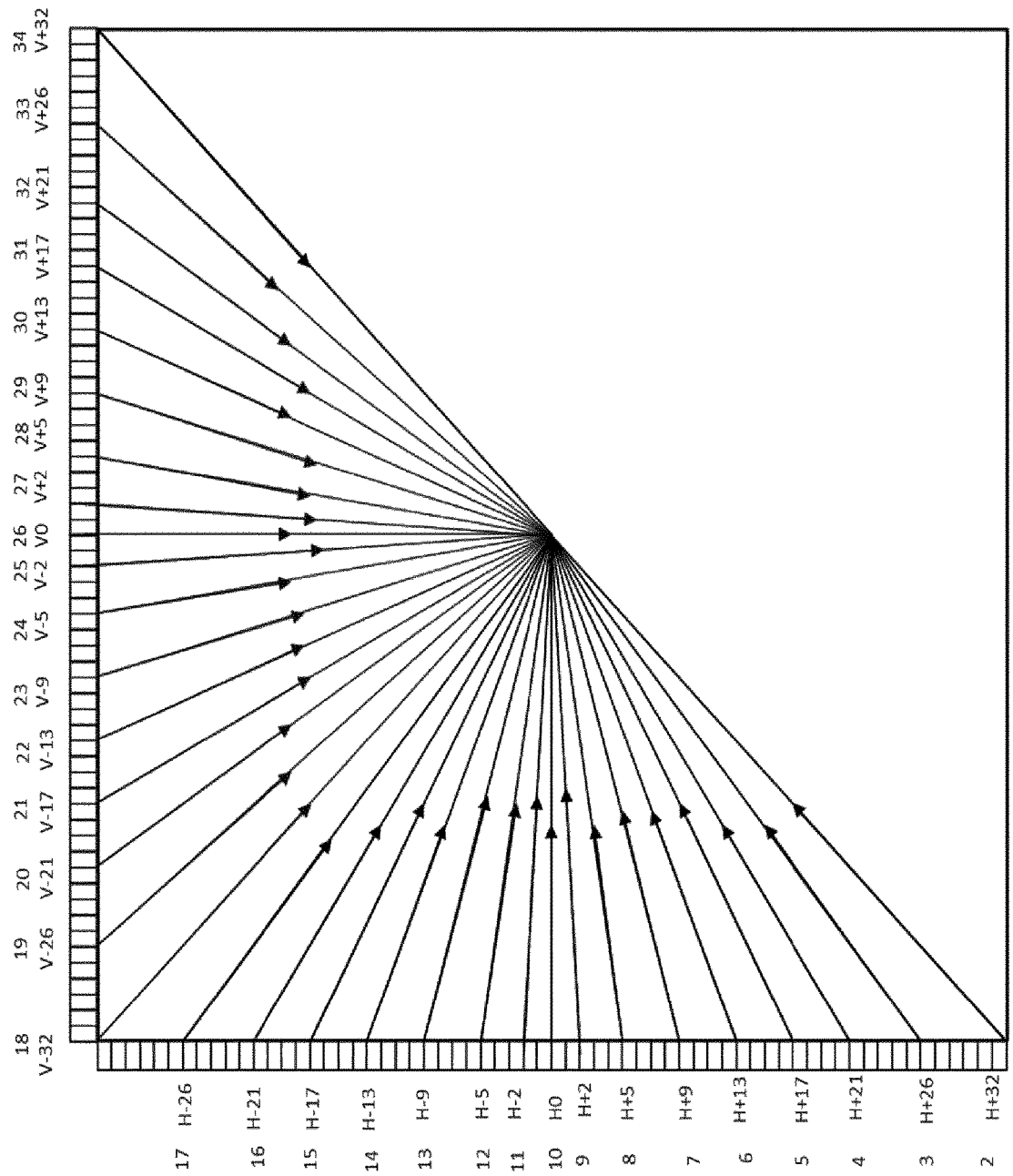
FIG. 2 illustrates intra prediction directions in HEVC.

The next step, i.e., the intra sample prediction, consists of predicting the pixels of the target CU based on the reference samples. As mentioned before, in order to predict different kinds of content efficiently, HEVC supports a range of prediction models. Planar and DC prediction modes are used to predict smooth and gradually changing regions, whereas angular prediction modes are used to capture different directional structures. HEVC supports 33 directional prediction modes which are indexed from 2 to 34. These prediction modes correspond to different prediction directions as illustrated in FIG. 2. The number denotes the prediction mode index associated with the corresponding direction. The modes 2 to 17 indicate horizontal predictions (H−26 to H+32) and the modes 18 to 34 indicate vertical predictions (V−32 to V+32).

As shown in FIG. 2, the defined angular directions have a sample accuracy of $1/32$. That is, between any two adjacent reference samples, there are 32 possible directions. The defined directions can be distinguished as either vertical or horizontal. The predictions in horizontal directions use either only left reference samples or some left and some top reference samples. Similarly, the predictions in vertical directions use either only top reference samples or some top and some left reference samples. The directions which use only left reference samples or only the top reference samples are defined to be positive directions. Thus, we have horizontal positive directions from H0 to H+32 that use only the left reference samples. Similarly, we have vertical positive directions from V0 to V+32 that use only the top reference samples. Other horizontal and vertical directions (H−2 to H−26 and V−2 to V−32) are defined to be negative directions and they use reference samples both on the left and on the top. Table 1 shows the relationship between the prediction mode and the angle parameter A as specified by HEVC.

In HEVC reference code, a reference array is first constructed using the top and left reference samples. For vertical predictions, the reference array is horizontal and for horizontal predictions, the reference array is vertical. For the modes with positive angle parameter A (modes 2 to 10 and 26 to 34), the reference array is simply the top or left reference samples depending on the direction:

topRef[x]=P[x−1][−1],0≤x≤2N,for vertical predictions leftRef[y]=P[−1][y−1],0≤y≤2N,for horizontal predictions where N is the CU size. It is conventional to initialize the sample co-ordinates to (0,0) at the top-left pixel of the target CU. Therefore, the top reference samples will have their y-coordinate as −1 and the left reference samples will have their x-co-ordinate as −1.

For the modes with negative angle parameter A (modes 11 to 25), the reference array needs pixels from both the top and left reference. In this case, the reference array will extend to the negative indices beyond 0. Sample values on the reference array with positive indices are obtained as above depending on vertical or horizontal prediction. Those on the reference array with negative indices are obtained by projecting the left (for vertical predictions) or top reference pixels (for horizontal predictions) on the reference array along the prediction direction.

Once the reference array is constructed, the prediction at any pixel position (x, y) inside the target CU is obtained by projecting the pixel position to the reference array along the selected direction and then copying the reference array sample value at (x, y). The reference sample value is computed at a sample resolution of ($1/32$) by interpolating between two adjacent samples as illustrated below:

$P[x][y]=((32−f)*topRef[x+i+1]+f*topRef[x+i+2]+16)>>5),0≤x,y<N$ for vertical predictions $P[x][y]=((32−f)*leftRef[y+i+1]+f*leftRef[y+i+2]+16)>>5),0≤x,y<N$,for horizontal predictions, where i and f denote the integer part and the fractional part of the projected displacement from the pixel location (x, y).

If Δ denotes the projected displacement, then
Δ=(x+1)*A, for horizontal predictions, and
Δ=(y+1)*A, for vertical predictions.
i=Δ>>5,
f=Δ & 31.

Notice that, if f=0, that is, there is no fractional part, then the prediction is equal to the reference array sample in the direction of prediction.

As we observe from the above expressions, the vertical predictions are independent of the y-coordinate and the horizontal predictions are independent of the x-coordinate. This means that, for vertical predictions, the prediction values are repeated along the direction of prediction from the reference array on the top. Similarly, for horizontal predictions, the prediction values are repeated along the direction of prediction from the reference array on the left. Therefore, if two or more pixel co-ordinates have the same projection point on the reference array, they have identical prediction values.

In the JEM code the number of prediction modes has been increased to 67, which includes one planar mode, one DC mode, and 65 angular modes. The higher number of angular modes correspond to 65 prediction directions where the prediction directions correspond to the 33 directions in HEVC plus additional 32 directions that correspond to the middle of any two adjacent directions. In other words, the prediction direction in JEM has twice the angle resolution of HEVC. The higher number of prediction modes have been proposed to exploit the possibility of such angular structures with proposed higher block sizes. Corresponding to higher number of modes, we have higher number of angle parameter A values. The modes are numbered from 2 to 66 in the increasing order and in the same fashion as done in HEVC from 2 to 34.

In addition to the square CUs, JEM can also have rectangular CUs because of quad-tree and binary-tree (QTBT)

structure. In this case, for positive directions, the reference array is constructed as follows:

topRef[x]=P[x−1][−1],0≤x≤W+H,for vertical predictions leftRef[y]=P[−1][y−1],0≤y≤W+H,for horizontal predictions where W and H denote the width and the height of the target CU, respectively. The prediction process basically remains the same as in HEVC. The pixel values are computed as:

P[x][y]=((32−f)*topRef[x+i+1]+f*topRef[x+i+2]+16)>>5,0≤x<W,0≤y<H,for vertical predictions P[x][y]=((32−f)*leftRef[y+i+1]+f*leftRef[y+i+2]+16)>>5,0≤x<W,0≤y<H,for horizontal predictions, As in HEVC, the directions have a sample accuracy of (1/32).

Some of the prediction modes such as the DC mode and directly horizontal (H0 or 10) and vertical modes (V0 or 26) may cause discontinuity at the CU boundaries after the prediction. Therefore, in HEVC, as well as in JEM, such prediction modes are followed by a post-processing step where the boundary predicted samples are smoothed using a low-pass filter.

As shown in the previous section, all the angular prediction models in HEVC or JEM use samples on the reference array and repeat the values along the direction of prediction. Only for some predictions, the boundary pixels are low-pass filtered to avoid discontinuity. But then the number of boundary pixels affected by the filtering process is limited, from one to a few pixels. These prediction models are good as long as the change in intensity values along the selected directions is small. In natural imagery, it is common to have varying intensity values because of various reasons. Especially, when the CU size is large, it is more common to have higher changes in intensity values where directional structures span larger lengths. Therefore, a better approach would be to use models of intensity gradient. One such model is interpolation, which interpolates pixel values in-between two or more known pixel values.

Figure 3:
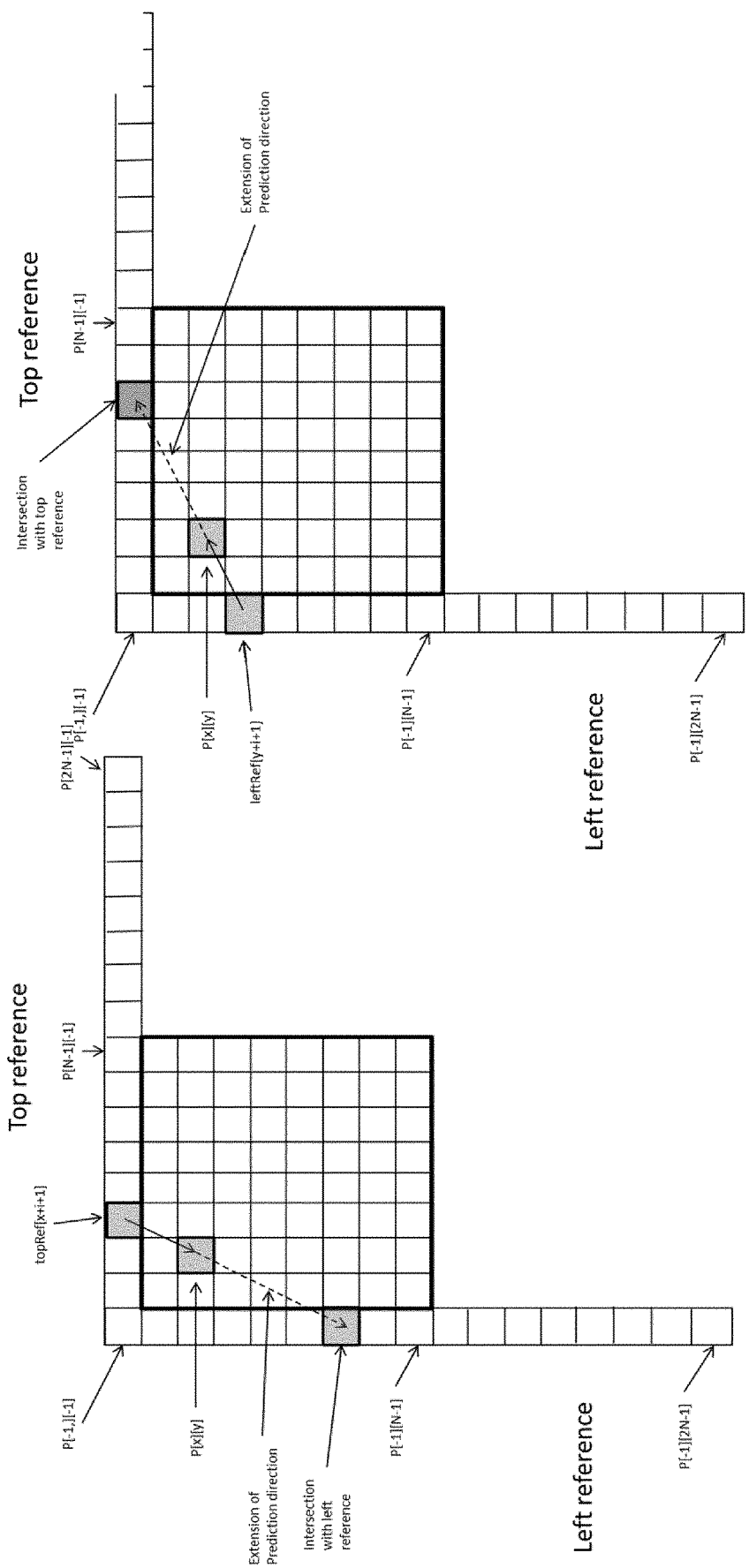
FIG. 3(a) shows an extension of a positive vertical direction intersecting the left reference.
FIG. 3(b) shows an extension of a positive horizontal direction intersecting the top reference.
Figure 4:
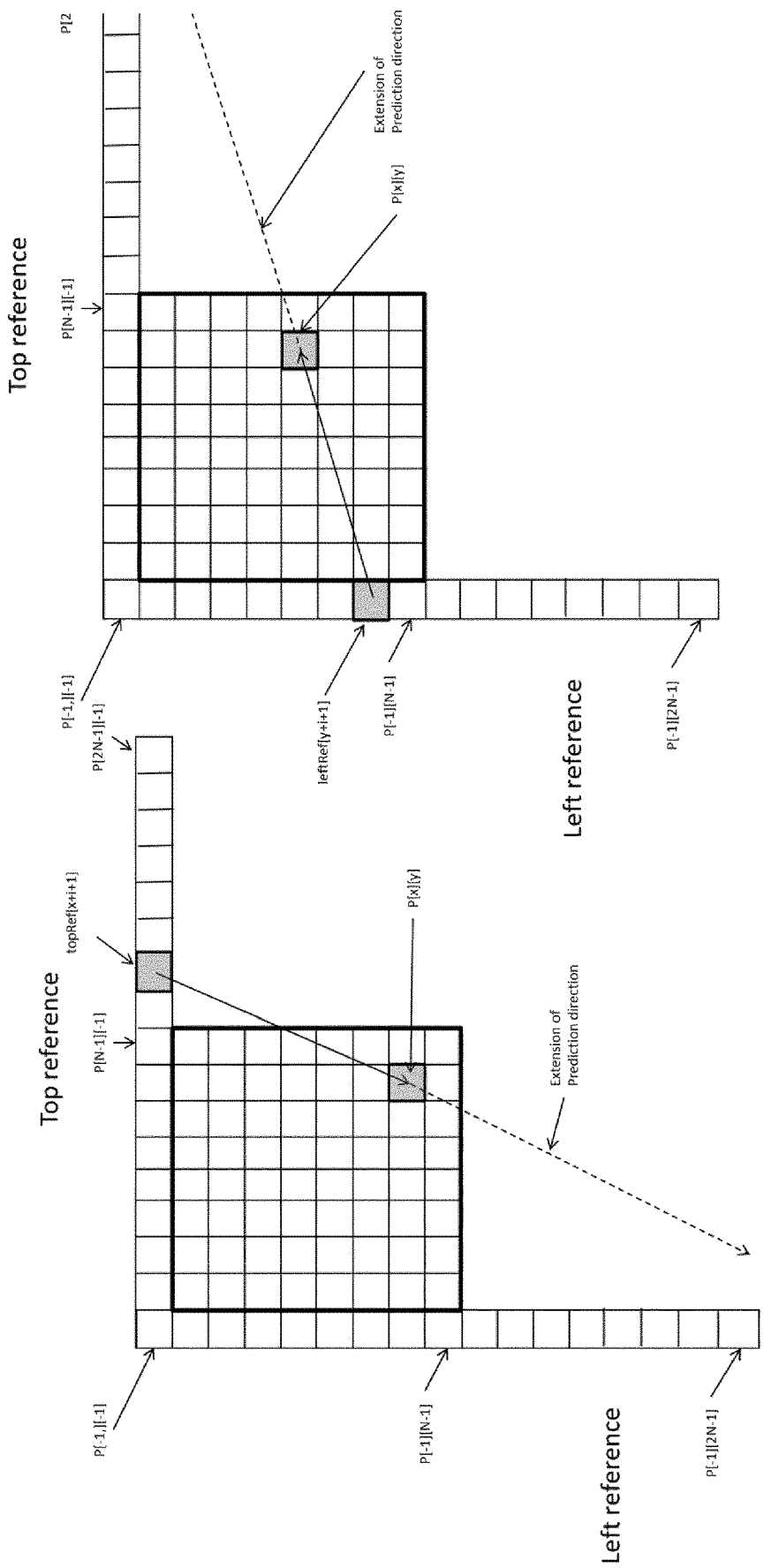
FIG. 4(a) shows an extension of a positive vertical direction missing the left reference.
FIG. 4(b) shows an extension of a positive horizontal direction missing the top reference.
Figure 5:
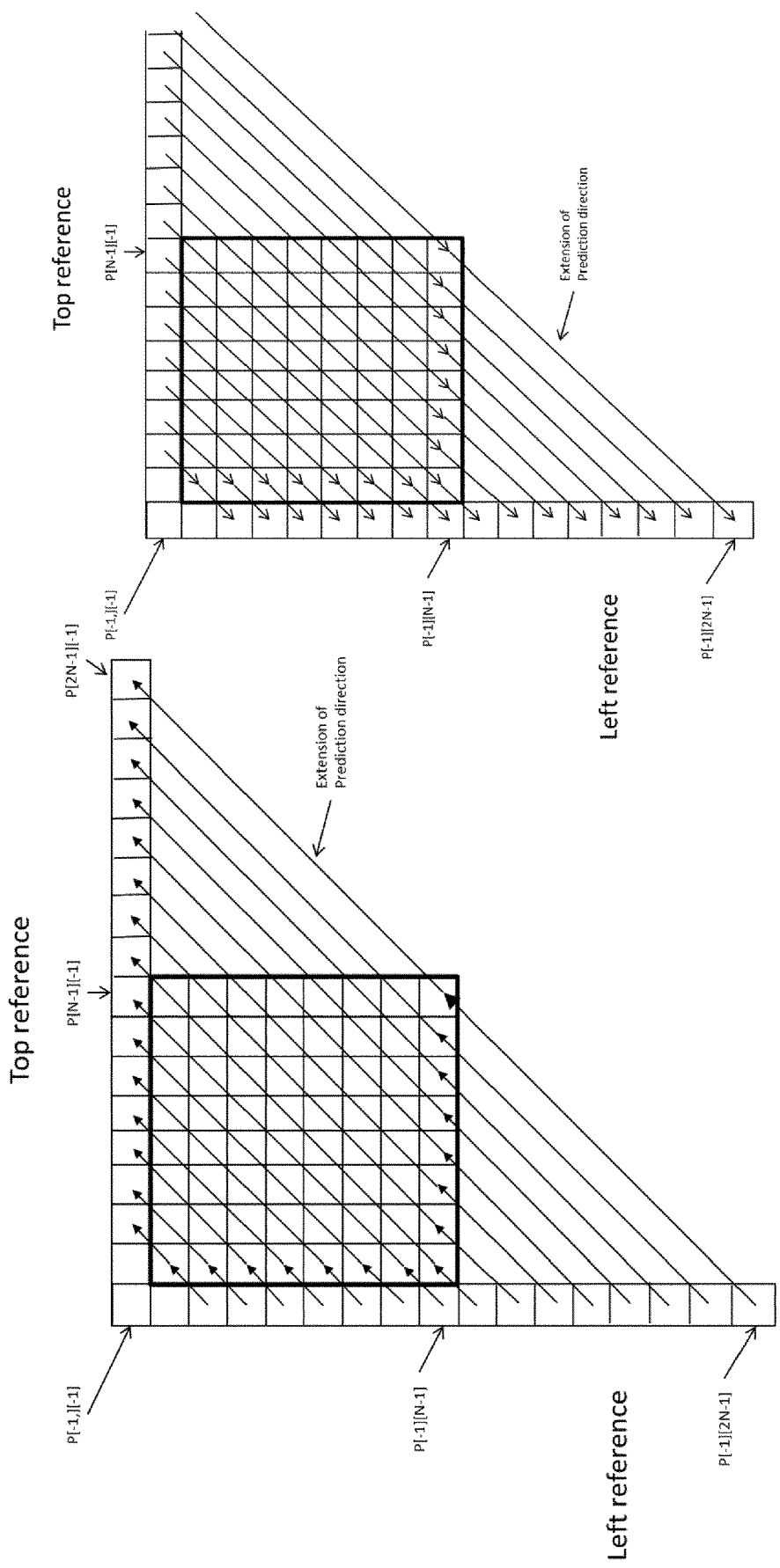
FIG. 5(a) shows HEVC prediction mode 2.
FIG. 5(b) shows HEVC prediction mode 34.

As shown in the previous section, HEVC and JEM aim to model different directional structures by different angular prediction models. Depending on the directionality, some prediction models are termed positive and some are termed negative. Notice that, for strictly positive angular predictions (i.e., with A>0), if the prediction direction is extended for some pixels in the opposite direction of the reference array, it intersects the other reference. For example, for vertical positive directions, the extension will intersect the left reference column. Similarly, for horizontal positive directions, the extension will intersect the top reference row. This is shown in FIG. 3. However, also note that, since the reference row on the top and the column on the left have finite lengths (2N in HEVC, H+W in JEM), predictions for some pixels, when extended in the opposite direction, will miss the other reference (See FIG. 4). For only the first and last angular prediction modes (2 and 34 in HEVC, 2 and 66 in JEM), all pixels in the target CU will have their prediction direction intersect the opposite reference when extended. This is shown in FIG. 5.

The idea of copying the prediction at any pixel from the reference array is based on the intuition that, if any object in the CU has the selected directionality, the pixel value at the reference array and the pixel inside the CU will be correlated. For positive prediction directions, the directionalities intersect the CUs on the top and the left side of the current CU. Therefore, if the extended predictions intersect the other reference pixels, it is natural to expect that the reference pixel value at the intersection point will also be correlated to the target pixel inside the CU. This gives us the idea that we can improve the prediction value of the pixel inside the CU using two reference pixels instead of just the one pixel value on the reference array. The simplest way to do this is through linear interpolation, which we explain in the next section.

Linear interpolation is a well-known mathematical technique to compute the value of a 1-D function at an intermediate point lying between two other points, where its values are known. If f(x) denotes a function whose values at x=a and x=b, b>a, are known, then its values at any point x, a≤x≤b, can be obtained by interpolation. The underlying assumption is that the function varies linearly between the given two points a, b and therefore given its values at x=a and x=b, its value at any other point between a and b can be determined exactly. On the other hand, if the function is not a linear one but its values are known only at two points, then the best we can do is to model the function as a straight line.

Figure 6:
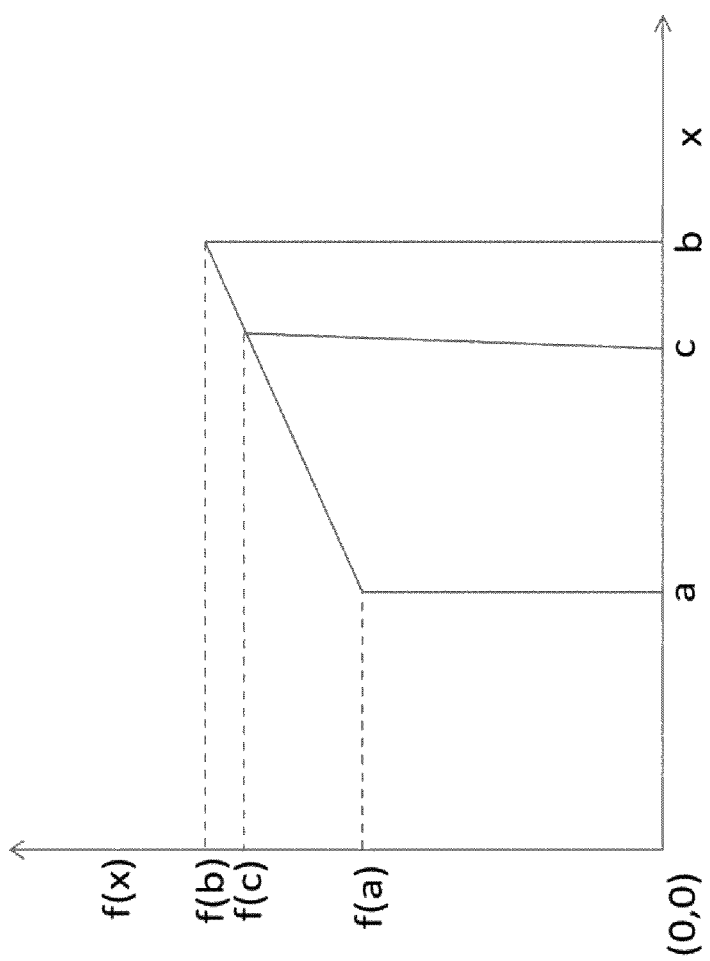
FIG. 6 shows linear interpolation in one dimension.
Figure 7:
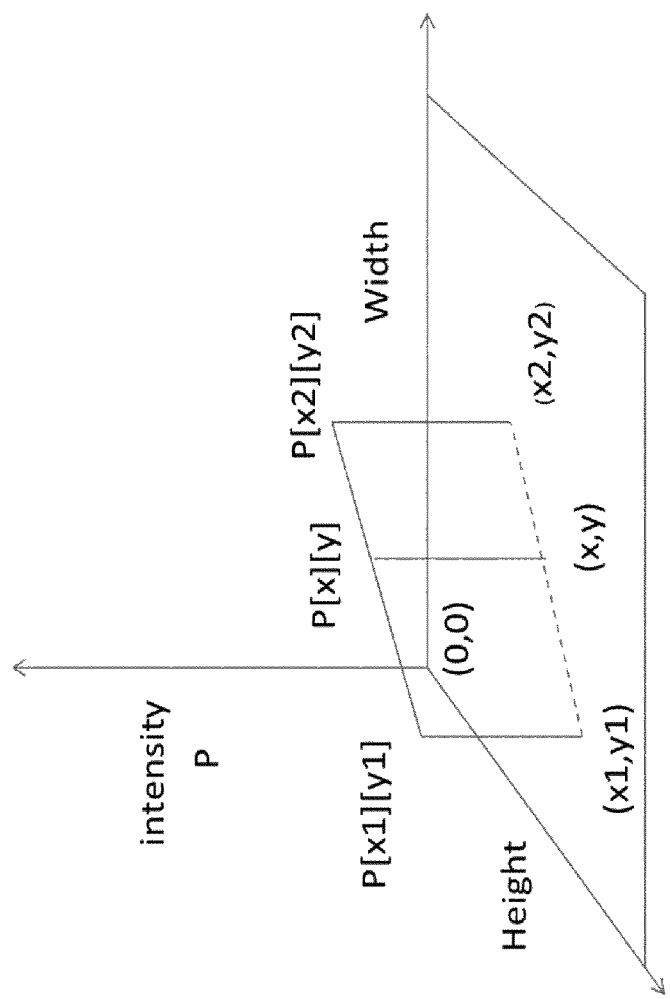
FIG. 7 shows linear interpolation in two dimensions.

Consider the function f(x) in FIG. 6. Let f(a) and f(b) denote its values at x=a and at x=b, respectively. Let us denote the length of the line segment between a and b as d=|b−a|. Then, using linear interpolation, the value of f at a point c which is at l distance from a and r distance from b is found as:

$$f(c) = \frac{l*f(b)+r*f(a)}{l+r} = \frac{l*f(b)+r*f(a)}{d}$$

This interpolation formula gives a value which lies between the two known values. That is, f(a)≤f(c)≤f(b) if f(b)≥f(a), or f(a)≥f(c)≥f(b) if f(b)≤f(a). As c gets closer to a, f(c) gets closer to f(a). Similarly, if c gets closer to b, f(c) gets closer to f(b). Finally if c=a, then f(c)=f(a), or if c=b, f(c)=f(b). The above interpolation formula can be rewritten as:

$$f(c) = \frac{l*f(b)+(r+l-l)*f(a)}{d} =$$
$$\frac{l*f(b)+(d-l)*f(a)}{d} = f(a) + \left(\frac{l}{d}\right)(f(b)-f(a)) = f(a) + \Delta_{f(a)}$$

where $$\Delta_{f(a)} \equiv \left(\frac{l}{d}\right)(f(b)-f(a))$$

denotes the change with respect to $f(a)$. We can also write $\Delta_{f(a)}=l*m$, where m denotes the slope of the line segment. As we see, $\Delta_{f(a)}$ is a function of only the distance between c and a, that is, l, since, for given values at a and b, the slope is fixed.

If the function $f$ represents the intensity in an image, the above formula can be used to interpolate pixel intensity at any pixel position that lies on a line segment joining two pixel locations. If P[x1][y1] and P[x2][y2] represent the pixel intensities at (x1, y1) and (x2, y2), respectively, then the intensity at (x, y), which lies on the line joining (x1, y1) and (x2, y2) can be computed as:

P[x][y]=P[x1][y1]+Δ$_p$, where $$\Delta_p \equiv \left(\frac{l}{d}\right)(P[x2][y2] - P[x1][y1]),$$

d represents the distance between (x1, y1) and (x2, y2), l represents the distance between (x, y) and (x1, y1). $\Delta_p$ represents the change in pixel intensity with respect to the value at (x1, y1). In image processing, it is customary to use bilinear interpolation, that uses four pixel values, to interpolate intermediate pixel values; but since we want to preserve directionality of structures, we will apply only linear interpolation along the prediction directions.

In the following, for the clarity of presentation, the interpolation theory is presented only for the positive vertical predictions. For positive horizontal predictions, the theory remains the same since horizontal predictions can be implemented by swapping the top reference and the side reference and swapping the height and the width. Also for the sake of generality, we assume rectangular CUs since square CUs are just special cases as far as prediction is concerned. Note that, in quad-tree binary-tree (QTBT) partitioning, as done in JEM, we will have both square and rectangular CUs whereas in quad-tree partitioning as done in HEVC, we will have only square CUs. Therefore, the theory will be valid for both kinds of partitioning structures.

Figure 8:
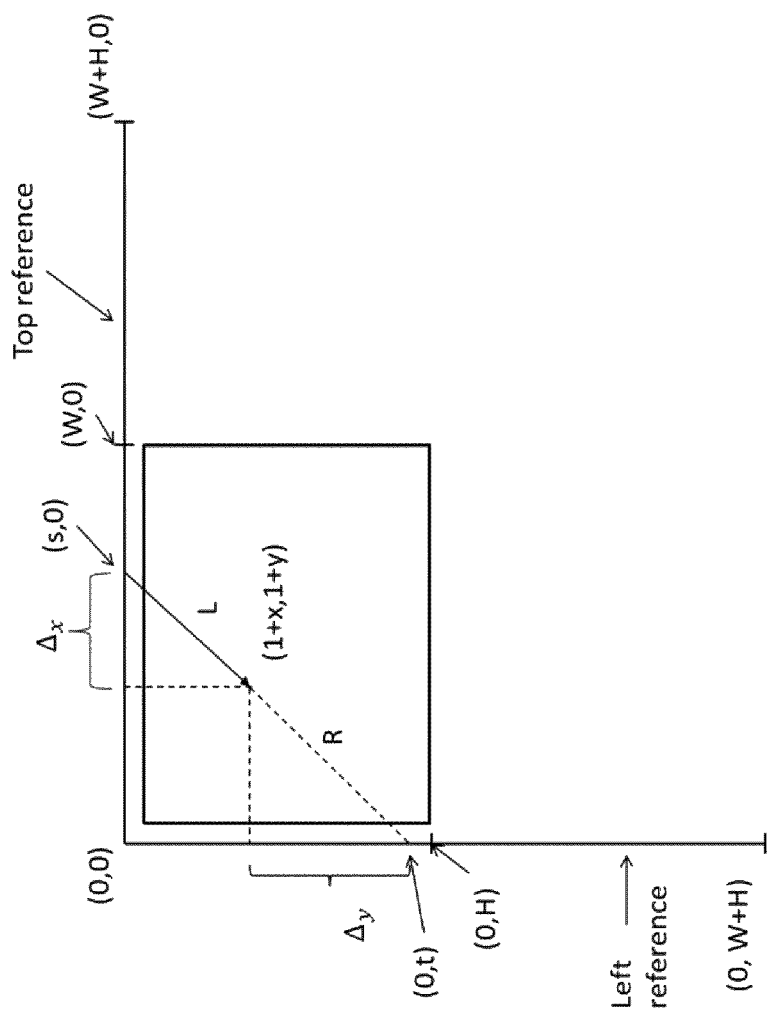
FIG. 8 shows interpolation in a positive vertical prediction.

Refer to FIG. 8. For easier explanation, we have displaced the origin of the co-ordinate system to the location of the top-left neighbor pixel of the target block. Therefore, the origin now coincides with the first sample of the top reference as well as the first sample of the left reference. We are interested in predicting the value of a pixel located at (x, y), $0 \leq x < W$, $0 \leq y < H$, in the target block. The co-ordinate of the pixel is (1+x, 1+y) in the new co-ordinate system. For the positive direction as shown, let (s, 0) denote the co-ordinate of the top reference sample (either one of the pixels or interpolated at resolution (1/32)) that would be normally copied at the target location. We will refer to the sample at (s, 0) as the first reference sample for the target pixel. We extend the prediction direction towards bottom left and let (0, t) denote the co-ordinate of the left reference sample (either one of the pixels or interpolated at resolution (1/32)). Both s and t have a sample resolution of (1/32). We will refer to the sample at (0, t) as the second reference sample for the target pixel.

Let $\Delta_x$ denote the projected displacement on the top reference. Similarly let $\Delta_y$ denote the projected displacement on the left reference. For positive prediction $\Delta_x \geq 0$, and $\Delta_y \geq 0$.

As we have seen earlier, for an angle parameter A, $\Delta_x$ is given as $\Delta_x = (1+y)*A$ To compute $\Delta_y$, we proceed as follows. First, using the projected displacements, we get $s = ((1+x) \ll 5) + \Delta_x$, $t = ((1+y) \ll 5) + \Delta_y$.

Using similarity of triangles, we get:

$$\frac{(1+y) \ll 5}{t} = \frac{\Delta_x}{s}$$

From this we get, $$t = \frac{s*((1+y) \ll 5)}{\Delta_x}$$
$$= \frac{(((1+x) \ll 5) + \Delta_x)*((1+y) \ll 5)}{\Delta_x}$$
$$= ((1+y) \ll 5) + \frac{(((1+x)(1+y)) \ll 10)}{\Delta_x}$$

Comparing this with the expression for t earlier, we get $$\Delta_y = \frac{((1+x)(1+y) \ll 10)}{\Delta_x}$$

For implementation purpose, we can use $$\Delta_y = \frac{(((1+x)(1+y)) \ll 10) + (\Delta_x \gg 1)}{\Delta_x}$$

Let $i_x$ and $f_x$ denote the integer part and the fractional part of $\Delta_x$. That is, $i_x = \Delta_x \gg 5$, and $f_x = \Delta_x \& 31$.

Let $P_1$ denote the first reference sample value. Then as we have seen earlier:

$P_1 = ((32-f_x)*\text{topRef}[x+i_x+1] + f_x*\text{topRef}[x+i_x+2] + 16) \gg 5$.

Similarly, let $i_y$ and $f_y$ denote the integer part and the fractional part of $\Delta_y$. That is, $i_y = \Delta_y \gg 5$, and $f_y \Delta_y \& 31$.

Let $P_2$ denote the second reference sample value. Then $P_2((32-f_y)*\text{leftRef}[y+i_y+1] + f_y*\text{leftRef}[y+i_y+2] + 16) \gg 5$.

Denoting the distance of the pixel at (x, y) in the target block from the reference samples at (s, 0) and (0, t) by L and R, respectively, we can interpolate the value at (x, y) as:

$$P[x][y] = \frac{L*P_2 + R*P_1}{L+R}$$
$$= P_1 + \frac{L}{D}(P_2 - P_1)$$
$$= P_1 + \Delta P,$$

where $D \equiv L+R$, and $$\Delta P \equiv \left(\frac{L}{D}\right)(P_2 - P_1).$$

ΔP here represents the change in prediction value with respect to the first reference sample.

In the current prediction method, only $P_1$ is used as the prediction. As we see here, in the interpolation approach, we just need to add an additional term to the existing prediction value. The additional term depends on the ratio $$\left(\frac{L}{D}\right)$$

and the difference between the two reference sample values. The ratio $$\left(\frac{L}{D}\right)$$

can be calculated using triangle similarity. Referring to FIG. 8, we see that $$\frac{L}{D} = \frac{\Delta_x}{s}$$

Therefore, the update term can be computed as $$\frac{(\Delta_x * (P_2 - P_1) + (s \gg 1))}{s}$$

Finally the interpolated value at target pixel position (x, y) is given as:

$$P[x][y] = P_1 + \frac{(\Delta_x * (P_2 - P_1) + (s \gg 1))}{s}$$

In the present HEVC and JEM reference softwares, $\Delta_x$ and the prediction value $P_1$ are already computed and available. Here are the additional steps for getting the interpolated prediction:

1. Compute $\Delta_y$ using the expression mentioned earlier.
2. Compute the integer part and the fractional part of $\Delta_y$. Using these, compute the second reference sample value $P_2$ on the left reference.
3. Compute s and compute the update term. Add the update term to the existing prediction value.

As illustrated earlier, there may be some pixels for which the extension of prediction direction will not intersect the left reference. That is, we do not have a second reference sample. For these cases, we will have the integral part of t larger than the length of the left reference, that is, W+H. If we follow the existing prediction, i.e., repetition for these pixels and interpolation for the others, then there may be sharp discontinuities in the prediction inside the target block. To avoid this and to have smooth interpolation inside the target block, we will apply interpolation to all pixels inside the target block. Therefore, we need to find techniques which will still correspond to the physical notion of interpolation and be meaningful in the present context. In any case, we need to compute only the update term mentioned in the previous paragraph. Depending on how we calculate this term, we present four different interpolation methods in the following.

Interpolation Method 1

Figure 9:
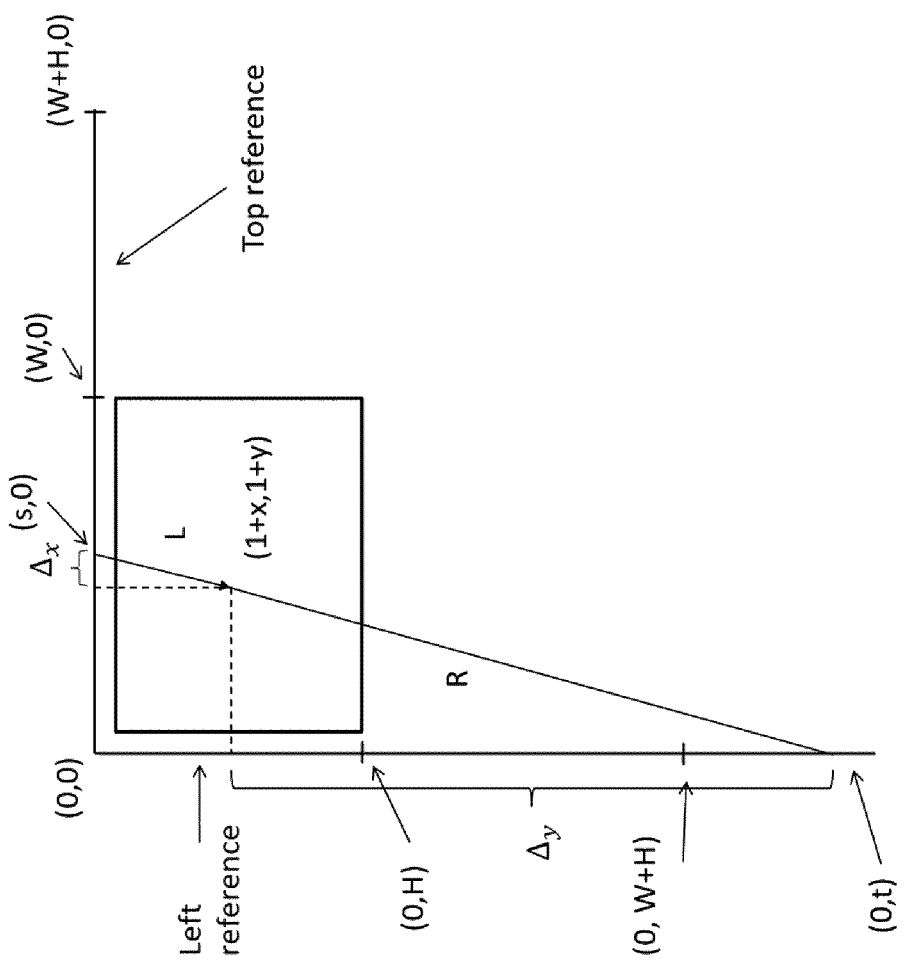
FIG. 9 shows interpolation method 1 where the left reference is extended below with its last sample value.

In this method, we assume that the last pixel value of the left reference is repeated beyond its size. Therefore, for any target pixel, if the second reference sample falls beyond the length of the left reference, we just use the last reference sample, that is, the sample at H+W. Consequently, theoretically, the left reference is extended below as much as required, as shown in FIG. 9.

Recall that the integer and the fractional parts of $\Delta_y$ are $i_y$ and $f_y$. Therefore, to compute the second reference sample, we do as follows:

if $1+y+i_y \geq W+H, P_2=$leftRef$[W+H]$;

Else, $P_2=((32-f_y)*$leftRef$[y+i_y+1]+f_y*$leftRef$[y+i_y+2]+16)\gg 5$.

The rest of the steps remain the same as in the previous section.

Interpolation Method 2

Figure 10:
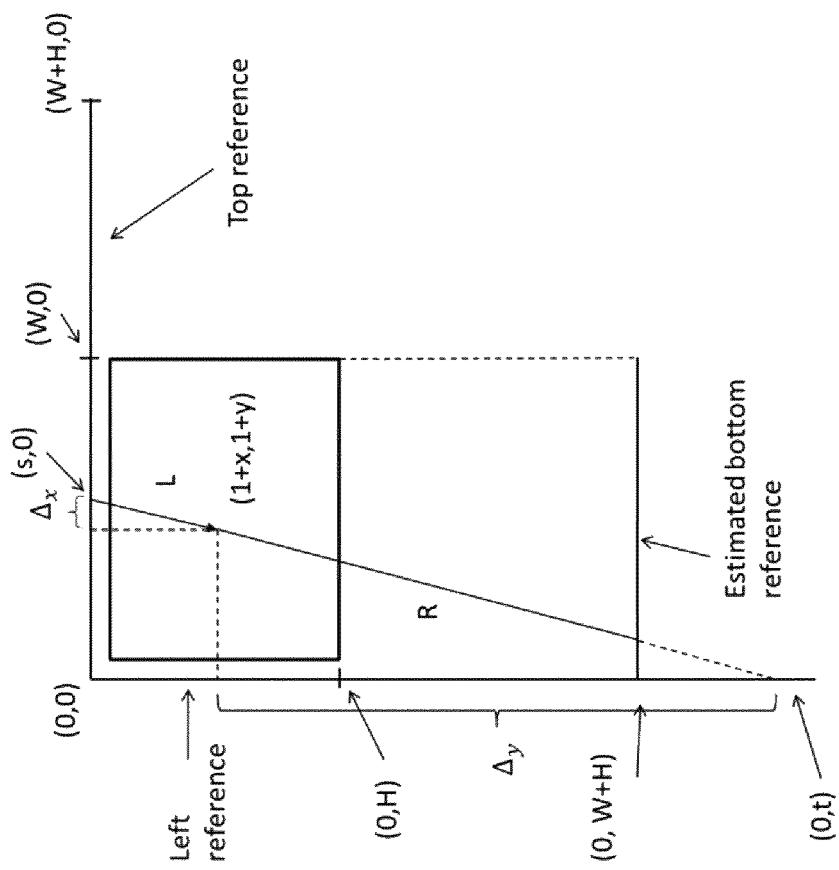
FIG. 10 shows interpolatio method 2 where a new bottom reference is estimated using the last sample of left reference.

In this method, for the target pixels not having a second reference sample, we estimate a bottom row reference as shown in FIG. 10 and use the sample on it as the second reference. The sample values on the bottom reference are all identical and they are equal to the last sample of the left reference. Note that this is an estimated reference, not a true reference since those sample values are not yet decoded.

For the pixels not having a second reference pixel, $1+y+i_y \geq W+H$. In this case, the extension of the prediction direction will intersect the bottom reference. Therefore, the length R, which is the distance between the target pixel and the second reference sample is now changed. The new R now refers to the distance between the location of the target pixel and the reference sample on the bottom reference. Now using triangle similarity, we get $$\frac{L}{D} \equiv \frac{L}{L+R} = \frac{1+y}{W+H}.$$

Therefore, the interpolation is given as follows:
If $i+y+i_y<W+H$, interpolation is done as in section 5.
Else, $$P_2 = leftRef[W+H]. \text{ and}$$

$$\Delta P = \frac{(1+y)*(P_2 - P_1) + ((W+H) \gg 1)}{W+H}$$

$$P[x][y] = P_1 + \Delta P.$$

Interpolation Method 3

In this method, we do as in Method 2 but estimate the bottom reference differently. Instead of repeating the last sample value of the left reference leftRef[W+H], we estimate the sample values using the last sample of top reference and the last sample of the left reference.

Figure 11:
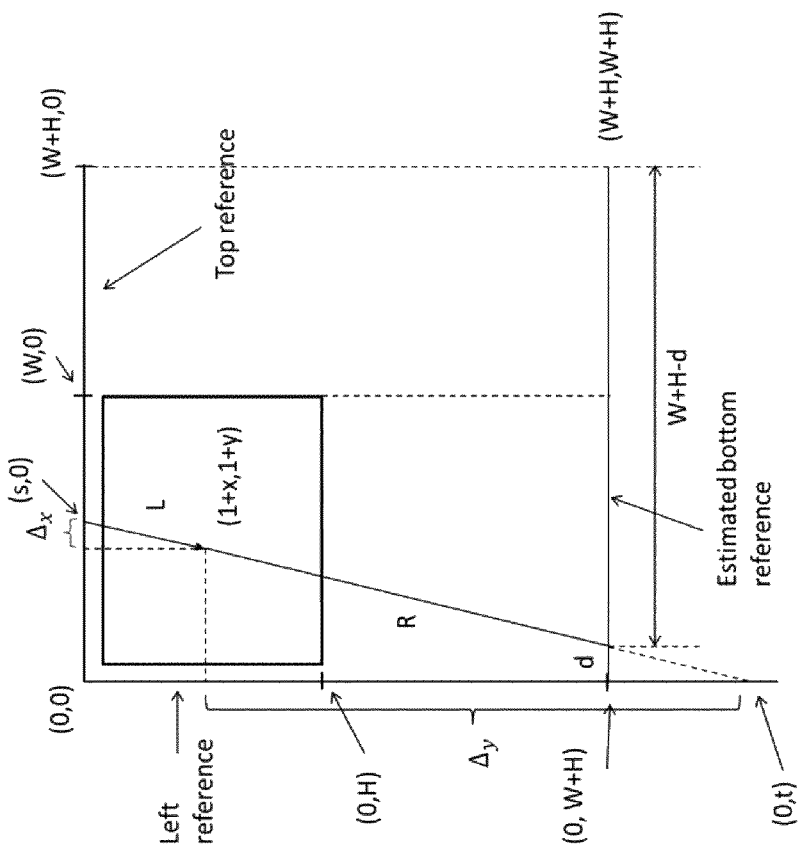
FIG. 11 shows interpolation method 3 where a new bottom reference is estimated usign the last samples of top and left references.

Refer to FIG. 11. Let d represent the distance from the left reference at which the extension of the prediction direction intersects the bottom reference. d can be calculated using triangle similarity as $$\frac{d}{s} = \frac{r - ((H+W) \ll 5)}{t} = 1 - \frac{((H+W) \ll 5)}{t}$$

-continued

Hence,
$$d = s - \frac{s*((H+W) \ll 5)}{r_i}.$$

This can be expressed, for implementation, as $$d = s - \frac{s*((H+W) \ll 5) + (f \gg 1)}{t}$$

To compute the second reference sample $P_2$ first we estimate the reference sample at (W+H, W+H) as P[W+H][W+H]=(topRef[W+H]+leftRef[W+H])/2.

Then we estimate the second reference sample using linear interpolation $$P_2 = \frac{d*P[W+H][W+H] + (((H+W) \ll 5) - d)*leftRef[W+H] + ((H+W) \ll 4)}{((W+H) \ll 5)}$$

Now the interpolation at the target pixel is done as follows:

If $i+y+i_y<W+H$, interpolation is done as in section 5.

Else, compute $P_2$ as above. Then compute $\Delta P$ and P[x][y] as $$\Delta P = \frac{(1+y)*(P_2-P_1) + ((W+H) \gg 1)}{W+H}$$

$$P[x][y] = P_1 + \Delta P.$$

Interpolation Method 4

Figure 12:
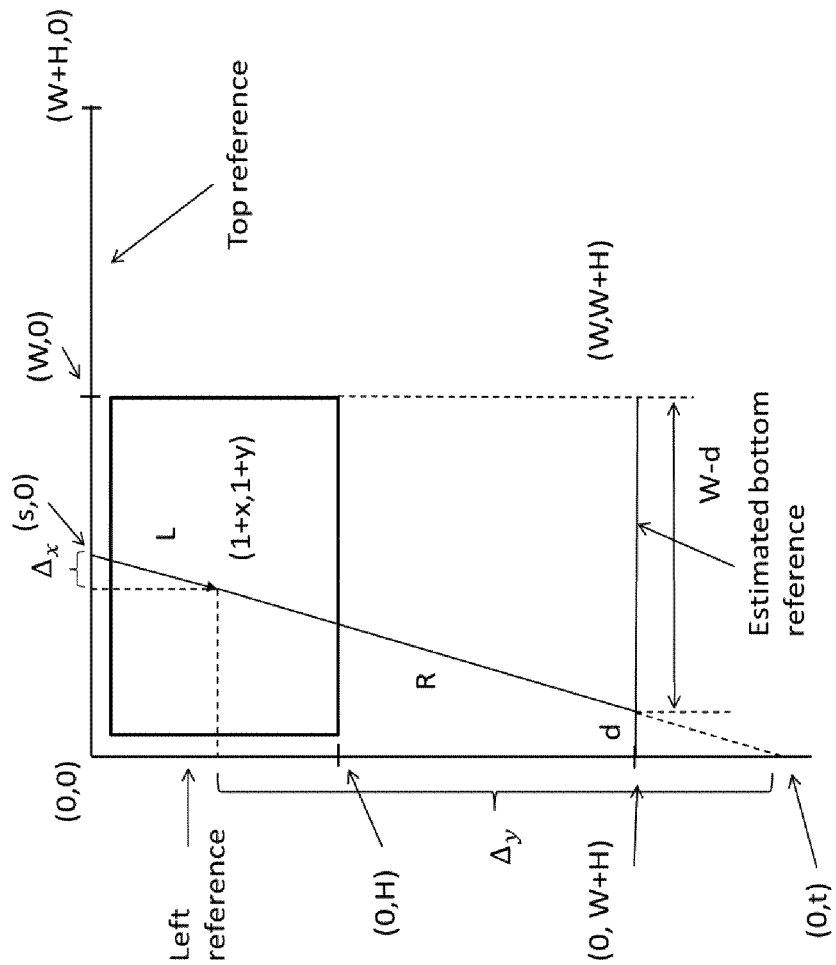
FIG. 12 shows an estimation of a bottom reference using an alternate bottom reference sample estimation.

In method 3, we used a bottom reference length of (W+H). And estimated the values using leftRef[W+H] and topRef[W+H]. But for the interpolation of target pixels, we do not need a bottom reference of length W+H. This is because, for all positive vertical predictions, the second reference samples, if they are on the bottom reference, will lie within a distance of W. Secondly, we also observe that those bottom reference samples are closer to topRef[W] than topRef[W+H]. Therefore, for more accurate estimation of bottom reference, we can use topRef[W] instead of topRef[W+H] for bottom reference sample estimation. This is shown in FIG. 12.

As in method 3, first we calculate the distance d at which the extension intersects the bottom reference line:

$$d = s - \frac{s*((H+W) \ll 5) + (T \gg 1)}{t}.$$

We estimate the reference sample at (W, W+H) as a weighted average:

P[W][W+H]=(W*topRef[W]+(H+W)*leftRef[W+H]+((2*W+H)>>1))/(2*W+H).

Then we estimate the reference sample at distance d:

$$P_2 = \frac{d*P[W][W+H] + ((W \ll 5) - d)*leftRef[W+H] + (W \ll 4)}{(W \ll 5)}$$

The interpolation at the target pixel is given as follows:

If $i+y+i_y<W+H$, interpolation is as in section 5.

Else, compute $P_2$ as above. Then compute $\Delta P$ and P[x][y] as $$\Delta P = \frac{(1+y)*(P_2-P_1) + ((W+H) \gg 1)}{W+H}$$

$$P[x][y] = P_1 + \Delta P.$$

Note that, in all methods, for the pixels where the extension of the prediction direction intersects the left reference, i.e, when the true second reference is available, the interpolation is the same. They only differ for the pixels where the true second reference sample is not available, because the extension of the prediction direction misses the left reference.

Chroma Interpolation

In HEVC, the chroma components' prediction is dependent on the LUMA component prediction mode. The chroma components are tested only with 5 prediction modes for selecting the best prediction mode. The modes are PLANAR, DC, purely horizontal (mode 10), purely vertical (mode 26), and the prediction mode of the LUMA component, called the direct (or derived) mode. If the direct mode equals any of the previous four, that is, planar, dc, purely horizontal, and purely vertical, then the vertical diagonal mode 34 is substituted for that mode.

In JEM, in addition to these five prediction modes (that is, planar (mode 0), DC (mode 1), purely horizontal (mode 18), purely vertical (mode 50), and the direct mode) there is a new mode called LM-Chroma. But the new mode does not use any of the defined prediction modes, rather the prediction is constructed from the reconstructed LUMA block. In order to differentiate the direct mode from LM-CHROMA, the direct mode is called the DM_CHROMA mode. If the DM-CHROMA mode equals one of the fixed four modes (i.e., planar, DC, purely horizontal, and purely vertical), then the vertical diagonal mode 66 is substituted for that mode.

Furthermore, unlike in HEVC, in JEM the chroma CU partitioning is de-coupled from the LUMA CU partitioning in INTRA frames. Therefore, the DM_CHROMA mode may correspond to the prediction mode of a LUMA CU which does not spatially correspond to the chroma CU under consideration In the proposed interpolation, we perform interpolation for the direct mode (in HEVC) or the DM_CHROMA mode (in JEM) if the mode is strictly positive, either vertical or horizontal.

Signaling of Interpolation

The interpolative predictions that we proposed above are models based on our physical intuition of object orientations and intensity variation in an image. They do not guarantee that the resulting RD performance will be necessarily better than the plain reference sample repetition. Therefore, under the present aspects described herein, it is proposed to include interpolation as an option by enabling a flag in the SPS, or PPS, or slice header.

Once the flag is enabled, every INTRA CU having a positive angular prediction will have either interpolative prediction or plain sample repetitive prediction. This is signaled to the decoder using a 1-bit flag. The 1-bit flag is context-encoded using context 0.

For the chroma components, we can follow one of two signaling approaches. In one approach, we can transmit one bit signaling if the corresponding chroma CU uses interpolation or not, independent of the luma CU signaling. The one-bit flag can be context-encoded using either context 0, or a mode-dependent context. The second approach is to use no additional signaling for the chroma components' prediction. Rather, the chroma components can use the same signaling as the luma CU at the center or top-left corner of the CTU. In this approach, if the luma signaling flag is enabled and the direct mode (in HEVC) or DM_Chroma (in JEM) is strictly negative, then the CU is predicted with interpolation, else the usual angular prediction is performed.

In the following section, we present several embodiments taking the above methods into consideration.

In the following embodiments, we assume the JEM codec, which is based on the HEVC codec. Except for the intra prediction with positive angular modes, every other tool remains unchanged. The flag indicating the interpolative prediction is context encoded with context zero. The proposed intra-prediction tools such as PDPC, NSST, EMT, etc., also remain unchanged. The chroma interpolation flag is derived from that of the luma CU located at the center of the CTU.

Embodiment 1

In this embodiment, we perform interpolation using method 1 described in section 5.1. The set of angular modes of prediction for which interpolation will be available can be one or more positive directions. For a Luma CU having one such prediction mode, the encoder decides between the interpolation prediction or the usual prediction based on the RD performance and this is signaled using a 1-bit flag which is context encoded with context 0. The decoder decodes the signaling flag only if the prediction mode belongs to the selected set. If the prediction mode does not belong to the set, the decoder does not decode any signaling flag and a default value of zero is assumed for the signaling flag. For the Chroma CU, the signaling flag used with the center Luma CU is used to decide if to perform interpolation with the DM_Chroma mode. If there is no signaling flag for the Luma CU (because its prediction mode does not fall in the set of modes which can undergo interpolation), a default value of 0 is used indicating the normal prediction.

Embodiment 2

In this embodiment, we perform interpolation using method 2 described in section 5.2. The set of angular modes of prediction for which interpolation will be available can be one or more positive directions. For a Luma CU having one such prediction mode, the encoder decides between the interpolation prediction or the usual prediction based on the RD performance and this is signaled using a 1-bit flag which is context encoded with context 0. The decoder decodes the signaling flag only if the prediction mode belongs to the selected set. If the prediction mode does not belong to the set, the decoder does not decode any signaling flag and a default value of zero is assumed for the signaling flag. For the Chroma CU, the signaling flag used with the center Luma CU is used to decide if to perform interpolation with the DM_Chroma mode. If there is no signaling flag for the Luma CU (because its prediction mode does not fall in the set of modes which can undergo interpolation), a default value of 0 is used indicating the normal prediction.

Embodiment 3

In this embodiment, we perform interpolation using method 3 described in section 5.3. The set of angular modes of prediction for which interpolation will be available can be one or more positive directions. For a Luma CU having one such prediction mode, the encoder decides between the interpolation prediction or the usual prediction based on the RD performance and this is signaled using a 1-bit flag which is context encoded with context 0. The decoder decodes the signaling flag only if the prediction mode belongs to the selected set. If the prediction mode does not belong to the set, the decoder does not decode any signaling flag and a default value of zero is assumed for the signaling flag. For the Chroma CU, the signaling flag used with the center Luma CU is used to decide if to perform interpolation with the DM_Chroma mode. If there is no signaling flag for the Luma CU (because its prediction mode does not fall in the set of modes which can undergo interpolation), a default value of 0 is used indicating the normal prediction.

Embodiment 4

In this embodiment, we perform interpolation using method 4 described in section 5.4. The set of angular modes of prediction for which interpolation will be available can be one or more positive directions. For a Luma CU having one such prediction mode, the encoder decides between the interpolation prediction or the usual prediction based on the RD performance and this is signaled using a 1-bit flag which is context encoded with context 0. The decoder decodes the signaling flag only if the prediction mode belongs to the selected set. If the prediction mode does not belong to the set, the decoder does not decode any signaling flag and a default value of zero is assumed for the signaling flag. For the Chroma CU, the signaling flag used with the center Luma CU is used to decide if to perform interpolation with the DM_Chroma mode. If there is no signaling flag for the Luma CU (because its prediction mode does not fall in the set of modes which can undergo interpolation), a default value of 0 is used indicating the normal prediction.

Embodiment 5

In this embodiment, we perform interpolation as in embodiments 1-4, except that the signaling flag is context-encoded using a mode-dependent context rather than context 0.

Embodiment 6

In this embodiment, we perform interpolation as in embodiments 1-5, but use a separate signaling flag for the chroma components. The signaling flag is context-encoded with context zero.

Embodiment 7

In this embodiment, we perform interpolation as in embodiments 6, but the signaling flag for the chroma components is context-encoded with a mode-dependent context.

Embodiment 8

In this embodiment, we follow any one of the embodiments 1-4. The option of adding interpolation is signaled in the slice header indicating that all CUs in a slice can use interpolation option.

Embodiment 9

In this embodiment, we follow any one of the embodiments 1-4. The option of adding interpolation is signaled in the PPS header indicating that all CUs in a frame can use interpolation option.

Embodiment 10

In this embodiment, we follow any one of the embodiments 1-4. The option of adding interpolation is signaled in the SPS header indicating that all frames in the sequence can use the interpolation option.

The proposed interpolation methods will model object orientations with improved intensity variation over a normal repetitive prediction leading to better RD performance.

Figure 16:
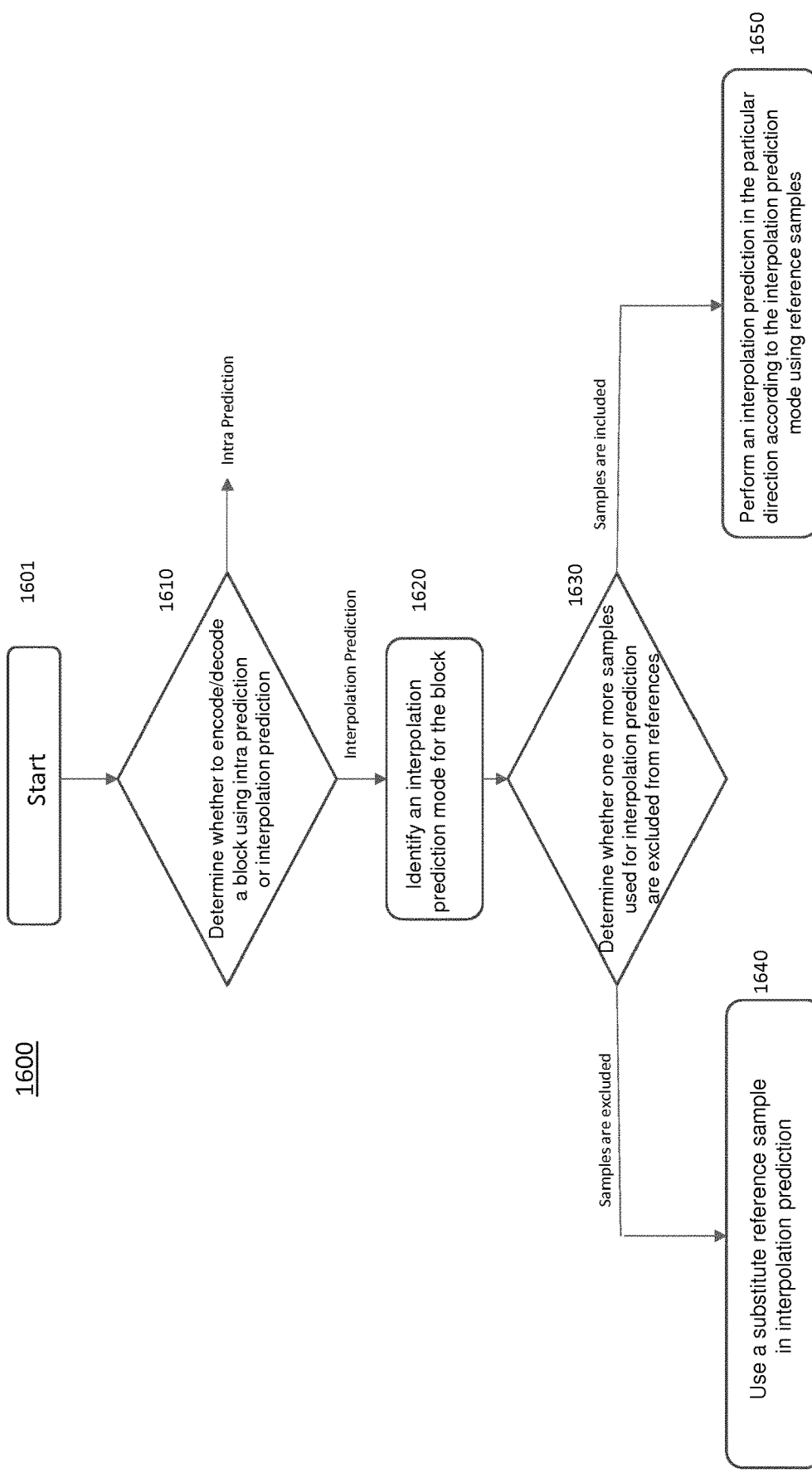
FIG. 16 shows one embodiment of a method under the described aspects.

One embodiment of a method 1600 under the general aspects is illustrated in FIG. 16. The method commences at Start block 1601 and proceeds to function block 1610 for determining whether to encode or decode a block using intra prediction or interpolation prediction. If it is determined that intra prediction is to be used, a normal intra prediction operation is performed. If, however, it is determined that an interpolation prediction is to be used, control proceeds from block 1610 to function block 1620 for identifying an interpolation prediction mode for the block. Control then proceeds from function block 1620 to function block 1630 for determining whether one or more samples to be used in the interpolation prediction are excluded from a reference set of samples. If it is determined that samples to be used in the interpolation prediction are included in the reference set of samples, control proceeds from function block 1630 to function block 1650 for performing an interpolation prediction in the particular direction according to the interpolation prediction mode using reference samples in the set. If, however, it is determined that samples to be used in the interpolation prediction are excluded from the set of reference samples, control proceeds from function block 1630 to function block 1640 for using a substitute reference sample in the interpolation prediction. The substitute reference sample or samples can be obtained using one of the aforementioned interpolation methods that find a substitute reference sample to be used in the interpolation process.

One embodiment of an apparatus 1700 for encoding or decoding a video block under the present aspects is illustrated in FIG. 17. The apparatus comprises a memory 1720 in signal communication with a processor 1710. The memory 1720 and processor 1710 can have various other input and output ports. Processor 1710 is configured to determine whether to encode or decode a block in a video image using intra prediction or interpolation prediction. If it is determined to use interpolation prediction, the processor performs identifying an interpolation prediction mode for the block, the mode having a particular direction of prediction; determining, for the identified interpolation prediction mode, whether one or more samples to be used for the interpolation are excluded from a reference section for performing the interpolation prediction in the particular direction. If it is determined that one or more of the samples are excluded from the reference section, the processor uses a substitute reference sample in performing interpolation prediction. If it is determined that one or more of the samples are included in the reference section, the processor performs an interpolation prediction in the particular direction according to the interpolation prediction mode using reference samples.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

The present description illustrates the present principles. It will thus be appreciated that those skilled in the art will be able to devise various arrangements that, although not explicitly described or shown herein, embody the present principles and are included within its spirit and scope.

All examples and conditional language recited herein are intended for pedagogical purposes to aid the reader in understanding the present principles and the concepts contributed by the inventor(s) to furthering the art, and are to be construed as being without limitation to such specifically recited examples and conditions.

Moreover, all statements herein reciting principles, aspects, and embodiments of the present principles, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the present principles. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The present principles as defined by such claims reside in the fact that the functionalities provided by the various recited means are combined and brought together in the manner which the claims call for. It is thus regarded that any means that can provide those functionalities are equivalent to those shown herein.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

In conclusion, an improved method of performing intra prediction for encoding or decoding is provided that uses interpolation. In the interpolation, substitute samples are found for samples to be used in the interpolation calculation that lie outside a normal reference range. The substitute samples can be repeated end samples from the bottom of a reference portion to the left of the target block, or right samples of a reference portion above the target block, or some calculated or estimated value based on known reference samples. An encoder can signal to a decoder whether to use intra prediction or interpolation prediction.

The invention claimed is:

1. A method, comprising:
   determining whether to encode a block in a video image using intra prediction or intra prediction with pixel interpolation, wherein intra prediction with pixel interpolation comprises using a linear interpolation of a neighboring reference pixel from a top reference section above the block and a neighboring reference pixel from a left reference section left of the block;
   on condition it is determined to use intra prediction with pixel interpolation:
   identifying a prediction mode for the block, the prediction mode having a particular direction of prediction;
   determining, for the identified prediction mode, whether a reference sample to be used for the interpolation is excluded from the left reference section for performing the intra prediction with pixel interpolation in the particular direction;
   on condition it is determined that the reference sample is excluded from the left reference section, performing the intra prediction with pixel interpolation in the particular direction using a substitute reference sample;
   on condition it is determined that the reference sample is not excluded from the left reference section, performing the intra prediction with pixel interpolation in the particular direction using the reference sample,
   wherein the substitute reference sample is determined from a first reference sample corresponding to a width of the block in the top reference section and a second reference sample corresponding to a sum of the width and a height of the block in the left reference section.

2. The method of claim 1,
   wherein said substitute reference sample is determined from an estimate of the first reference sample and the second reference sample.

3. The method of claim 1, wherein said determination of either intra prediction or intra prediction with pixel interpolation is signaled using a 1-bit flag.

4. The method of claim 1, wherein the intra prediction with pixel interpolation is performed for a direct coding mode or a DM_CHROMA if the prediction mode is positive.

5. The method of claim 1, wherein the substitute reference sample is determined from a weighted average of the first reference sample corresponding and the second reference sample.

6. A method, comprising:
   determining whether to decode a block in a video image using intra prediction or intra prediction with pixel interpolation, wherein intra prediction with pixel interpolation comprises using a linear interpolation of a neighboring reference pixel from a top reference section above the block and a neighboring reference pixel from a left reference section left of the block;
   on condition it is determined to use intra prediction with pixel interpolation:
   identifying a prediction mode for the block, the prediction mode having a particular direction of prediction;
   determining, for the identified prediction mode, whether a reference sample to be used for the interpolation is excluded from the left reference section for performing the intra prediction with pixel interpolation in the particular direction;
   on condition it is determined that the reference sample is excluded from the left reference section, performing the intra prediction with pixel interpolation in the particular direction using a substitute reference samples;
   on condition it is determined that the reference sample is not excluded in from the let reference section, performing the intra prediction with pixel interpolation in the particular direction using the reference sample,
   wherein the substitute reference sample is determined from a first reference sample corresponding to a width of the block in the top reference section and a second reference sample corresponding to a sum of the width and a height of the block in the left reference section.

7. The method of claim 6, wherein said substitute reference sample is determined from an estimate of the first reference sample and the second reference sample.

8. The method of claim 6, wherein said determination of either intra prediction or intra prediction with pixel interpolation is based on a 1-bit flag.

9. The method of claim 6, wherein the intra prediction with pixel interpolation is performed for a direct coding mode or a DM_CHROMA if the prediction mode is positive.

10. The method of claim 6, wherein the substitute reference sample is determined from a weighted average of the first reference sample corresponding and the second reference sample.

11. An apparatus, comprising:
    a memory, and
    a processor, configured to:
    determine whether to encode a block in a video image using intra prediction or intra prediction with pixel interpolation, wherein intra prediction with pixel interpolation comprises using a linear combination of a neighboring reference pixel from a top reference section above the block and a neighboring reference pixel from a left reference section left of the block;
    on condition it is determined to use intra prediction with pixel interpolation:
    identify a prediction mode for the block, the prediction mode having a particular direction of prediction;
    determine, for the identified prediction mode, whether a reference sample to be used for the interpolation is excluded from the left reference section for performing the intra prediction with pixel interpolation in the particular direction;
    on condition it is determined that the reference sample is excluded from the left reference section, performing the intra prediction with pixel interpolation in the particular direction using a substitute reference sample;
    on condition it is determined that the reference sample is not excluded from the left reference section, performing the intra prediction with pixel interpolation in the particular direction using the reference sample,
    wherein the substitute reference sample is determined from a first reference sample corresponding to a width of the block in the top reference section and a second reference sample corresponding to a sum of the width and a height of the block in the left reference section.

12. The apparatus of claim 11, wherein said substitute reference sample is determined from an estimate of the first reference sample and the second reference sample.

13. The apparatus of claim 11, wherein said determination of either intra prediction or intra prediction with pixel interpolation is signaled using a 1-bit flag.

14. The apparatus of claim 11, wherein the intra prediction with pixel interpolation is performed for a direct coding mode or a DM_CHROMA if the prediction mode is positive.

15. The apparatus of claim 11, wherein the substitute reference sample is determined from a weighted average of the first reference sample corresponding and the second reference sample.

16. An apparatus, comprising:
a memory, and
a processor, configured to:
determine whether to decode a block in a video image using intra prediction or intra prediction with pixel interpolation, wherein intra prediction with pixel interpolation comprises using a linear interpolation of a neighboring reference pixel from a top reference section above the block and a neighboring reference pixel from a left reference section left of the block;
on condition it is determined to use intra prediction with pixel interpolation:
identify a prediction mode for the block, the prediction mode having a particular direction of prediction;
determine, for the identified prediction mode, whether a reference sample to be used for the interpolation is excluded from the left reference section for performing the intra prediction with pixel interpolation in the particular direction;
on condition it is determined that the reference sample is excluded from the left reference section, performing the intra prediction with pixel interpolation in the particular direction using a substitute reference sample;
on condition it is determined that the reference sample is not excluded from the left reference section, performing the intra prediction with pixel interpolation in the particular direction using the reference sample,
wherein the substitute reference sample is determined from a first reference sample corresponding to a width of the block in the top reference section and a second reference sample corresponding to a sum of the width and a height of the block in the left reference section.

17. The apparatus of claim 16, wherein said substitute reference sample is determined from an estimate of the first reference sample and the second reference sample.

18. The apparatus of claim 16, wherein said determination of either intra prediction or intra prediction with pixel interpolation is based on a 1-bit flag.

19. The apparatus of claim 16, wherein the intra prediction with pixel interpolation is performed for a direct coding mode or a DM_CHROMA if the prediction mode is positive.

20. The apparatus of claim 16, wherein the substitute reference sample is determined from a weighted average of the first reference sample corresponding and the second reference sample.

* * * * *